(12) United States Patent
Hong et al.

(10) Patent No.: US 10,635,212 B2
(45) Date of Patent: Apr. 28, 2020

(54) TOUCH SENSOR AND DISPLAY DEVICE INCLUDING THE TOUCH SENSOR

(71) Applicant: Samsung Display Co., Ltd., Yongin-si, Gyeonggi-do (KR)

(72) Inventors: Won Ki Hong, Yongin-si (KR); Tae Hee Lee, Yongin-si (KR); Won Sang Park, Yongin-si (KR)

(73) Assignee: Samsung Display Co., Ltd. (KR)

( * ) Notice: Subject to any disclaimer, the term of this patent is extended or adjusted under 35 U.S.C. 154(b) by 67 days.

(21) Appl. No.: 15/974,515

(22) Filed: May 8, 2018

(65) Prior Publication Data
US 2019/0012029 A1 Jan. 10, 2019

(30) Foreign Application Priority Data
Jul. 6, 2017 (KR) .................. 10-2017-0086117

(51) Int. Cl.
*G06F 3/041* (2006.01)
*G09G 3/20* (2006.01)
*G06F 3/047* (2006.01)

(52) U.S. Cl.
CPC ............ *G06F 3/0412* (2013.01); *G06F 3/047* (2013.01); *G06F 3/0414* (2013.01); *G06F 3/0416* (2013.01); *G09G 3/20* (2013.01)

(58) Field of Classification Search
None
See application file for complete search history.

(56) References Cited

U.S. PATENT DOCUMENTS

| 7,511,702 | B2 | 3/2009 | Hotelling |
| 7,538,760 | B2 | 5/2009 | Hotelling et al. |
| 8,654,524 | B2 | 2/2014 | Pance et al. |
| 8,686,952 | B2 | 4/2014 | Burrough et al. |
| 8,787,006 | B2 | 7/2014 | Golko et al. |
| 9,152,267 | B2 | 10/2015 | Seo et al. |
| 9,262,031 | B1 | 2/2016 | Moon et al. |

(Continued)

FOREIGN PATENT DOCUMENTS

| KR | 10-1663763 B1 | 9/2016 |
| KR | 10-2016-0131150 A | 11/2016 |
| KR | 10-2016-0137931 A | 12/2016 |

OTHER PUBLICATIONS

"Apple Follows Samsung's Technology . . . 'iPhone 8 Edge' Comes Out This Time?", obtained at: http://news1.kr/articles/?2957194 Apr. 4, 2017; 2 pages.

(Continued)

*Primary Examiner* — Duane N Taylor, Jr.
(74) *Attorney, Agent, or Firm* — Innovation Counsel LLP

(57) ABSTRACT

There are provided a touch sensor and a display device including the touch sensor. A touch sensor includes: first pressure sensors disposed in a first touch region; and second pressure sensors disposed in a second touch region, wherein the second touch region is disposed at least one side of the first touch region and has a curved shape, wherein a first pressure detection sensitivity of the first pressure sensors in response to a touch input that is applied in a direction perpendicular to the first touch region is different from a second pressure detection sensitivity of the second pressure sensors in response to a touch input that is applied in a normal direction of the second touch region.

28 Claims, 23 Drawing Sheets

(56) References Cited

U.S. PATENT DOCUMENTS

| | | |
|---|---|---|
| 9,274,660 B2 | 3/2016 | Bernstein et al. |
| 2013/0201131 A1* | 8/2013 | Choi ................ G06F 3/0488 345/173 |
| 2014/0028575 A1 | 1/2014 | Parivar et al. |
| 2014/0085213 A1 | 3/2014 | Huppi et al. |
| 2014/0091857 A1 | 4/2014 | Bernstein |
| 2014/0253477 A1* | 9/2014 | Shim ................ G06F 3/0487 345/173 |
| 2014/0293145 A1 | 10/2014 | Jones et al. |
| 2015/0261376 A1* | 9/2015 | Kim ................ G06F 3/0487 345/173 |
| 2015/0324056 A1* | 11/2015 | Sato ................ G06F 3/0416 345/174 |
| 2016/0062391 A1* | 3/2016 | Choi ................ H04M 1/0266 361/679.03 |
| 2016/0162100 A1 | 6/2016 | Hong et al. |
| 2016/0328036 A1 | 11/2016 | Lee |

OTHER PUBLICATIONS

"OLED 'iPhone 8' Launch above $1,000 . . . Manufacturing Cost for 3D Touch Module Soars 60%" obtained at: http://www.kbench.com/?q=node/173734 Mar. 15, 2017; 3 pages.

\* cited by examiner

TOUCH SENSOR AND DISPLAY DEVICE INCLUDING THE TOUCH SENSOR

RELATED APPLICATIONS

The present application claims priority to Korean Patent Application No. 10-2017-0086117, filed on Jul. 6, 2017, in the Korean Intellectual Property Office, the disclosure of which is incorporated by reference herein in its entirety.

BACKGROUND

1. Field

An aspect of the present disclosure relates to a touch sensor and a display device including the touch sensor.

2. Description of the Related Art

A touch sensor is a kind of input devices, and can be integrated with a display device. A user presses or touches the touch sensor while viewing an image displayed on a screen of the display device, so that a desired input in response to the viewing image can be conveniently provided.

There have recently been increasing demands for a touch sensor that is capable of sensing not only a position at which a touch input is received but also a pressure that is generated by the touch input. If a touch pressure is sensed as well as a touch position as described above, more various functions can be provided to a user.

SUMMARY

Embodiments of the present disclosure provide a touch sensor capable of sensing a touch pressure with high sensitivity and a display device including the touch sensor.

Embodiments of the present disclosure provide a touch sensor having improved pressure detection sensitivity at an edge portion that has a curved shape and a display device including the touch sensor.

According to an aspect of the present disclosure, a touch sensor includes: first pressure sensors disposed in a first touch region; and second pressure sensors disposed in a second touch region, wherein the second touch region is disposed at at least one side of the first touch region, and has a curved shape, wherein a first pressure detection sensitivity of the first pressure sensors in response to a touch input that is applied in a direction perpendicular to the first touch region is different from a second pressure detection sensitivity of the second pressure sensors in response to a touch input that is applied in a normal direction of the second touch region.

The first touch region may have a flat shape.

The second touch region may be disposed at both sides of the first touch region.

Each of the first pressure sensors and the second pressure sensors may include: a first electrode; a second electrode disposed to be spaced apart from the first electrode; and a pressure sensitive layer disposed between the first electrode and the second electrode.

The first electrode, the second electrode, and the pressure sensitive layer may be disposed on the same plane, and a first thickness of the pressure sensitive layer of the first pressure sensor may be smaller than a second thickness of the pressure sensitive layer of the second pressure sensor.

The first electrode, the second electrode, and the pressure sensitive layer may be disposed on the same plane, and a first distance between the first and second electrodes of the first pressure sensor may be longer than a second distance between the first and second electrodes of the second pressure sensor.

The second electrode may be disposed on the first electrode, and a first thickness of the pressure sensitive layer of the first pressure sensor may be larger than a second thickness of the pressure sensitive layer of the second pressure sensor.

The second electrode may be disposed on the first electrode, and a first overlapping area of the first and second electrodes of the first pressure sensor may be smaller than a second overlapping area of the first and second electrodes of the second pressure sensor.

Each of the first pressure sensors may include a first resistance sensing line of which at least a portion is bent, and each of the second pressure sensors may include a second resistance sensing line of which at least a portion is bent.

A first thickness of the first resistance sensing line may be smaller than a second thickness of the second resistance sensing line.

The display device may further include: a first bumper disposed on at least one of upper and lower surfaces of each of the first pressure sensors; and a second bumper disposed on at least one of upper and lower surfaces of each of the second pressure sensors.

A first overlapping area of the first pressure sensor and the first bump may be larger than a second overlapping area of the second pressure sensor and the second bumper.

A first height of the first bumper may be smaller than a second height of the second bumper.

The display device may further include third pressure sensors disposed in a third touch region. The third touch region may be disposed at one side of the first touch region and one side of the second touch region, and a third pressure detection sensitivity of the third pressure sensors may be smaller than the first pressure detection sensitivity of the first pressure sensors.

According to an aspect of the present disclosure, a display device includes: a display panel including a plurality of pixels disposed in a first display region and a second display region, the display panel displaying an image; and a touch sensor disposed on at least one of upper and lower surfaces of the display panel, the touch sensor including first pressure sensors disposed in a first touch region and second pressure sensors disposed in a second touch region, wherein the second display region and the second touch region have a curved shape, wherein a first structure of the first pressure sensors is different from a second structure of the second pressure sensors.

A center of curvature of the curved shape may be located on a rear surface that is opposite to a front surface on which the image is displayed, and a second pressure detection sensitivity of the second pressure sensor in response to a touch input that is applied in a normal direction of the second touch region may be greater than a first pressure detection sensitivity of the first pressure sensor in response to a touch input that is applied in a direction perpendicular to the first touch region.

Each of the first pressure sensors and the second pressure sensors may include: a first electrode; a second electrode disposed to be spaced apart from the first electrode; and a pressure sensitive layer disposed between the first electrode and the second electrode.

The first electrode, the second electrode, and the pressure sensitive layer may be disposed on the same plane, and a first thickness of the pressure sensitive layer of the first pressure sensor may be smaller than a second thickness of the pressure sensitive layer of the second pressure sensor.

The first electrode, the second electrode, and the pressure sensitive layer may be disposed on the same plane, and a first distance between the first and second electrodes of the first pressure sensor may be longer than a second distance between the first and second electrodes of the second pressure sensor.

The second electrode may be disposed on the first electrode, and a first thickness of the pressure sensitive layer of the first pressure sensor may be larger than a second thickness of the pressure sensitive layer of the second pressure sensor.

The second electrode may be disposed on the first electrode, and a first overlapping area of the first and second electrodes of the first pressure sensor may be smaller than a second overlapping area of the first and second electrodes of the second pressure sensor.

Each of the first pressure sensors may include e a first resistance sensing line of which at least a portion is bent, and each of the second pressure sensors may include a second resistance sensing line of which at least a portion is bent. A first thickness of the first resistance sensing line may be smaller than a second thickness of the second resistance sensing line.

The display device may further include: a first bumper disposed on at least one of upper and lower surfaces of each of the first pressure sensors; and a second bumper disposed on at least one of upper and lower surfaces of each of the second pressure sensors.

A first overlapping area of the first pressure sensor and the first bump may be larger than a second overlapping area of the second pressure sensor and the second bumper.

A first height of the first bumper may be different from a second height of the second bumper.

A center of curvature of the curved shape may be located on a first surface on which the image is displayed, and a second pressure detection sensitivity of the second pressure sensor in response to touch input that is applied in a normal direction of the second touch region may be smaller than a first pressure detection sensitivity of the first pressure sensor in response to touch input that is applied in a direction perpendicular to the first touch region.

According to an aspect of the present disclosure, a display device includes: a display panel displaying an image through a first display region and a third display region disposed at one side of the first display region; and a touch sensor disposed on at least one of upper and lower surfaces of the display panel, the touch sensor including first pressure sensors disposed in a first touch region corresponding to the first display region and third pressure sensors disposed in a third touch region corresponding to the third display region, wherein virtual buttons are displayed in the third display region, wherein a first structure of the first pressure sensors is different from a third structure of the third pressure sensors.

A third pressure detection sensitivity of the third pressure sensors may be smaller than a first pressure detection sensitivity of the first pressure sensors.

The first display region and the third display regions may have a flat shape.

The display panel may further include a second display region disposed at one sides of the first display region and the third display region, and the touch sensor may further include second pressure sensors disposed in a second touch region corresponding to the second display region. The second display region and the second touch region may have a curved shape.

A second pressure detection sensitivity of the second pressure sensors in response to a touch input that is applied in a normal direction of the second touch region may be larger than a first pressure detection sensitivity of the first pressure sensors in response to a touch input that is applied in a direction perpendicular to the first touch region.

BRIEF DESCRIPTION OF THE DRAWINGS

Example embodiments of the present disclosure will now be described more fully hereinafter with reference to the accompanying drawings; however, they may be embodied in different forms and should not be construed as limited to the embodiments set forth herein. Rather, these embodiments are provided so that the present disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
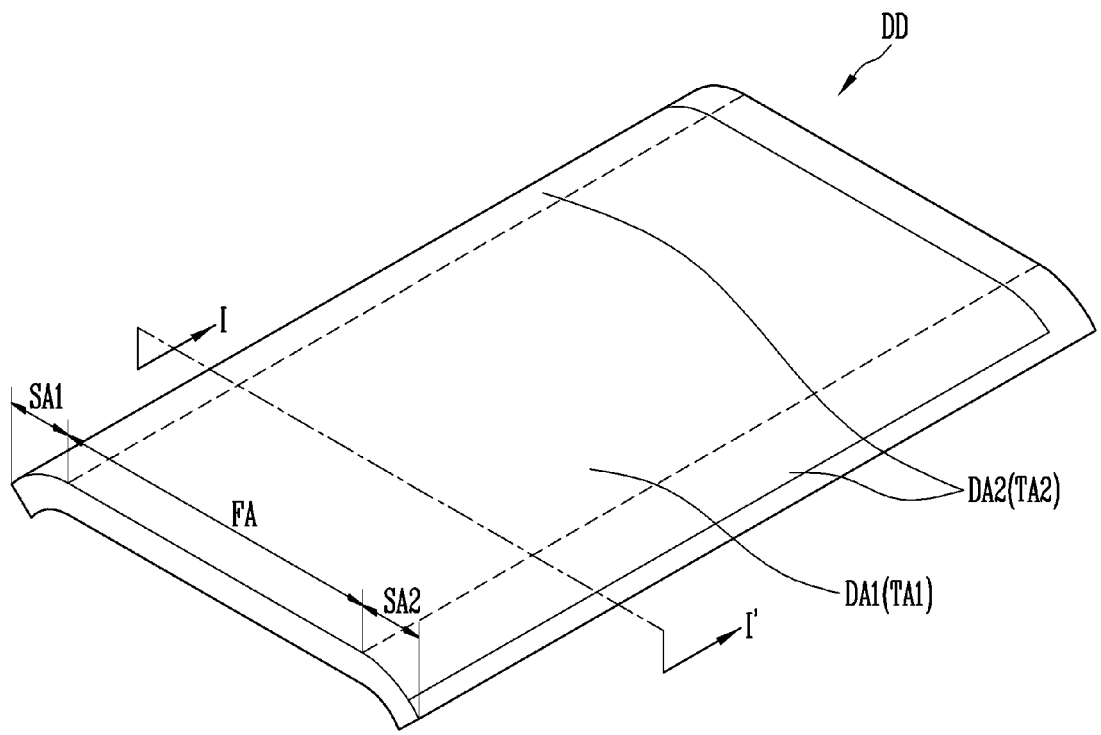
FIG. 1 is a view illustrating a display device according to an embodiment of the present disclosure.

In the following detailed description, certain exemplary embodiments of the present disclosure have been shown and described, simply by way of illustration. As those skilled in the art would realize, the described embodiments may be modified in various different ways without departing from the spirit or scope of the present disclosure. Accordingly, the drawings and description are to be regarded as illustrative in nature and not restrictive.

In the entire specification, when an element is referred to as being "connected" or "coupled" to another element, it can be directly connected or coupled to the another element or be indirectly connected or coupled to the another element with one or more intervening elements interposed therebetween. Further, some of the elements that are not essential to the complete understanding of the disclosure may be omitted for clarity. In addition, like reference numerals refer to like elements throughout.

Meanwhile, in the present specification, for convenience of description, a direction in which an image is displayed is referred to as an 'upper direction' or 'front direction,' and the opposite direction is referred to as a 'lower direction' or 'rear direction.'

Hereinafter, a touch sensor and a display device including the touch sensor will be described with reference to exemplary embodiments in conjunction with the accompanying drawings.

Figure 2:
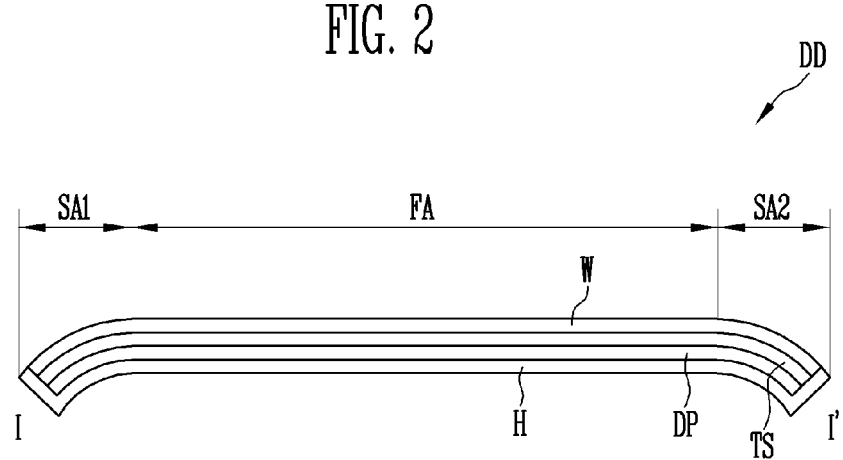
FIG. 2 is a view illustrating an embodiment of a section taken along line I-I' of FIG. 1.

FIG. 1 is a view illustrating a display device according to an embodiment of the present disclosure. FIG. 2 is a view illustrating an embodiment of a section taken along line I-I' of FIG. 1.

The display device DD according to the embodiment of the present disclosure may include a flat region FA that has a flat shape and curved regions SA1 and SA2 that are bent from edges of the flat region FA.

The curved regions SA1 and SA2 may be formed to have a predetermined curvature, and the center of curvature of the curved regions SA1 and SA2 may be located on a rear surface (e.g., a surface that is opposite to a surface on which an image is displayed) of the display device DD.

For example, the flat region FA may correspond to a portion at which a main image is displayed on a front surface in a touch-enabled display device, for example, a smart phone. In addition, each of the curved regions SA1 and SA2 may correspond to a portion at which a main image or sub-image is displayed on a side surface.

In the present specification, the display device DD including two curved regions SA1 and SA2 that are bent at both edge portions of the flat region FA is illustrated as an example, but the present disclosure is not limited thereto. In some cases, the display device DD may include the flat region FA and one curved region that is bent at one side of the flat region FA.

Referring to FIGS. 1 and 2, the display device DD according to the embodiment of the present disclosure may include a touch sensor TS, a display panel DP, a window W, and a housing H.

The touch sensor TS may sense a position of a touch input to touch regions TA1 and TA2 and a pressure caused by the touch input. The touch regions TA1 and TA2 may include a first touch region having a flat shape and at least one second touch region TA2 that is bent from an edge of the first touch region TA1 to have a curved shape.

The touch sensor TS may include pressure sensors disposed in the first touch region TA1 and the second touch region TA2. For example, the pressure sensor may include at least one of a pressure sensitive device including a pressure sensitive material or a pressure sensitive resistor, a deformation sensitive device including a strain gauge, a piezo-resistive device, a piezoelectric device, and a gap capacitance sensitive device.

In addition, the pressure sensor may include various pressure sensitive devices capable of sensing a pressure applied by a touch input. In the present disclosure, the pressure sensor is not particularly limited to a particular kind.

A configuration of the touch sensor TS according to the embodiment of the present disclosure and a driving method thereof will be described in detail below.

The display panel DP according to the embodiment of the present disclosure may display an image through display regions DA1 and DA2 in which a plurality of pixels is provided. The display regions DA1 and DA2 may include a first display region DA1 having a flat shape and at least one second display region DA2 that is bent from an edge of the first display region DA1 to have a curved shape.

The display panel DP and the touch sensor TS may overlap with each other. In addition, the display regions DA1 and DA2 of the display panel DP may correspond to the touch regions TA1 and TA2 of the touch sensor TS. In particular, the first display region DA1 may correspond to the first touch region TA1, and the second display region DA2 may correspond to the second touch region TA2.

However, the present disclosure is not limited thereto, and only a portion of the display regions DA1 and DA2 may be designated as the touch regions TA1 and TA2, or the display regions DA1 and DA2 and the touch regions TA1 and TA2 may not correspond to each other.

FIGS. 1 and 2 illustrate that the display panel DP is disposed on the bottom side of the touch sensor TS. However, the present disclosure is not limited thereto, and the positions of the display panel DP and the touch sensor TS may be interchanged.

The window W may be provided on a top side of the touch sensor TS. The window W may be implemented as a flexible window, but the material or property of the window W is not particularly limited.

In addition, the window may be provided in a single layer or be provided in a multi-layer.

The window W may serve as a front surface of the display device DD.

In addition, the window W is provided at an image display surface (e.g., an upper surface) of the display panel DP, and may be implemented to be substantially transparent such that light emitted from the display panel DP can be transmitted therethrough. In the description of the embodiment of the present disclosure, the term "substantially transparent"

may inclusively mean "transparent" or "translucent" to an extent to satisfy transparency in a predetermined range.

However, the window W may be omitted in some embodiments.

Meanwhile, although not shown in FIGS. 1 and 2, a polarizing layer may be interposed between the window W and the display panel DP.

The housing H according to the embodiment of the present disclosure may accommodate the touch sensor TS, the display panel DP, and the like. For example, as the display panel DP and the touch sensor TS are sequentially stacked on the housing H, the display panel DP and the touch sensor TS may be received in the housing H.

In addition, the window W may be provided on the housing H. Although not shown in FIGS. 1 and 2, a transparent adhesive member may be provided between the housing H and the display panel DP or between the window W and the housing H.

Figure 3:
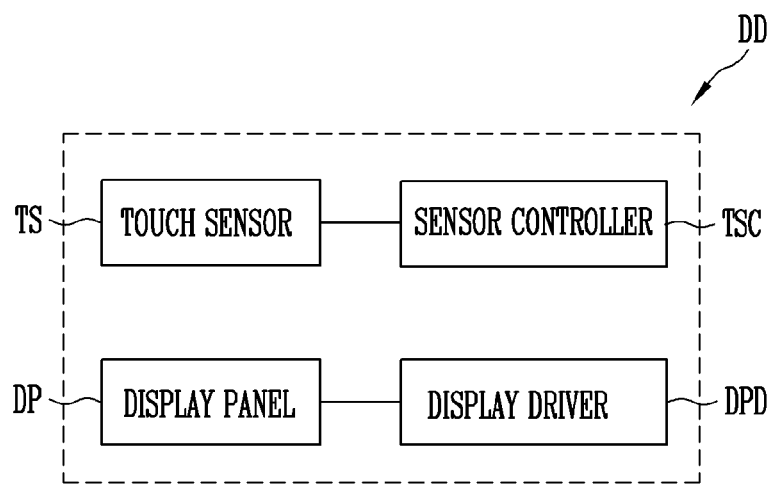
FIG. 3 is a view schematically illustrating a configuration of a display device according to an embodiment of the present disclosure.

FIG. 3 is a view schematically illustrating a configuration of a display device according to an embodiment of the present disclosure.

In FIG. 3, components similar or identical to those of FIGS. 1 and 2 are designated by like reference numerals, and their detailed descriptions will be omitted.

Referring to FIG. 3, the display device DD according to the embodiment of the present disclosure may further include a display driver DPD and a sensor controller TSC.

The sensor controller TSC may be electrically connected to the touch sensor TS and detect a touch input by using a sensing signal generated from the touch sensor TS.

To this end, the sensor controller TSC may detect a touch input by supplying, to the touch sensor TS, a signal to drive the touch sensor TS, and receiving a sensing signal generated from the touch sensor TS.

For example, the sensor controller TSC may detect a position at which a touch input is received and an intensity of a pressure caused by the touch input by analyzing a sensing signal generated from the touch sensor TS.

The display driver DPD may be electrically connected to the display panel DP to supply a signal to drive the display panel DP.

Specifically, the display driver DPD may include at least one of a scan driver, a data driver, and a timing controller to drive the display panel DP.

The display driver DPD may be provided outside of the display panel DP, or at least a portion of the display driver DPD may be integrated in the display panel DP.

The sensor controller TSC and the display driver DPD along with the touch sensor TS and the display panel DP may be accommodated in the above-described housing H. For example, the sensor controller TSC and the display driver DPD may be integrated on a printed circuit board to be received on a surface of the housing H, or be received in the housing H to be adjacent to a sidewall of the housing H.

Figure 4:
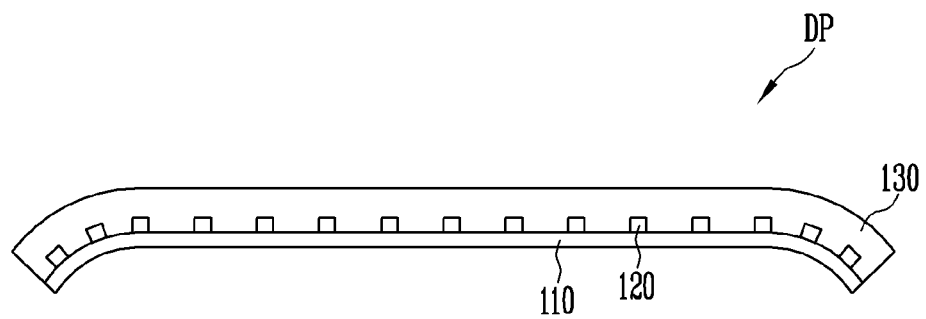
FIG. 4 is a view illustrating a configuration of the display panel shown in FIG. 2.

FIG. 4 is a view illustrating a configuration of the display panel shown in FIG. 2.

Referring to FIG. 4, the display panel DP according to the embodiment of the present disclosure may include a display substrate 110, a plurality of pixels 120, and an encapsulation layer 130.

The display substrate 110 may be made of an insulative material such as glass or resin, and have a single- or multi-layered structure. In addition, the display substrate 110 may be a flexible substrate having flexibility to be bendable or foldable. In some embodiments, the display substrate 110 may be a rigid substrate made of glass or tempered glass. However, in the present disclosure, the material or property of the display substrate 110 is not particularly limited.

According to one embodiment, the display substrate 110 may be a flexible substrate configured with a thin film made of a flexible plastic material. For example, the display substrate 110 may include at least one of polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, and cellulose acetate propionate. However, the material constituting the display substrate 110 may be variously changed. In an embodiment, the display substrate 110 may be made of a fiber reinforced plastic (FRP).

The plurality of pixels 120 may be provided on the display substrate 110. The pixels 120 may be provided in the display regions DA1 and DA2 of the display substrate 110. In some embodiments, each of the pixels 120 may include at least one light emitting device (e.g., an organic light emitting diode), but the present disclosure is not limited thereto. That is, in the present disclosure, the display panel DP is not particularly limited to a particular kind.

The encapsulation layer 130 may be provided on one surface (e.g., an upper surface) of the display substrate 110 on which the pixels 120 are provided. The encapsulation layer 130 may prevent moisture or oxygen from penetrating into the pixels 120.

The encapsulation layer 130 may be configured as a glass substrate or an insulating layer including one or more layers. For example, the encapsulation layer 130 may include at least one of glass, an organic material, and an inorganic material, and have a single- or multi-layered structure.

The encapsulation layer 130 may have a multi-layered structure including at least one organic layer and at least one inorganic layer, or have a single-layered structure including an organic/inorganic hybrid material.

The material of the organic layer may include an organic insulating material such as polyacryl, polyimide, fluorine-based compound such as Teflon, polyepoxy, and benzocyclobutene, but the present disclosure is not limited thereto. The material of the inorganic layer may include an inorganic insulating material such as polysiloxane, silicon nitride, silicon oxide, and metal oxide including aluminum oxide, but the present disclosure is not limited thereto.

Figure 5:
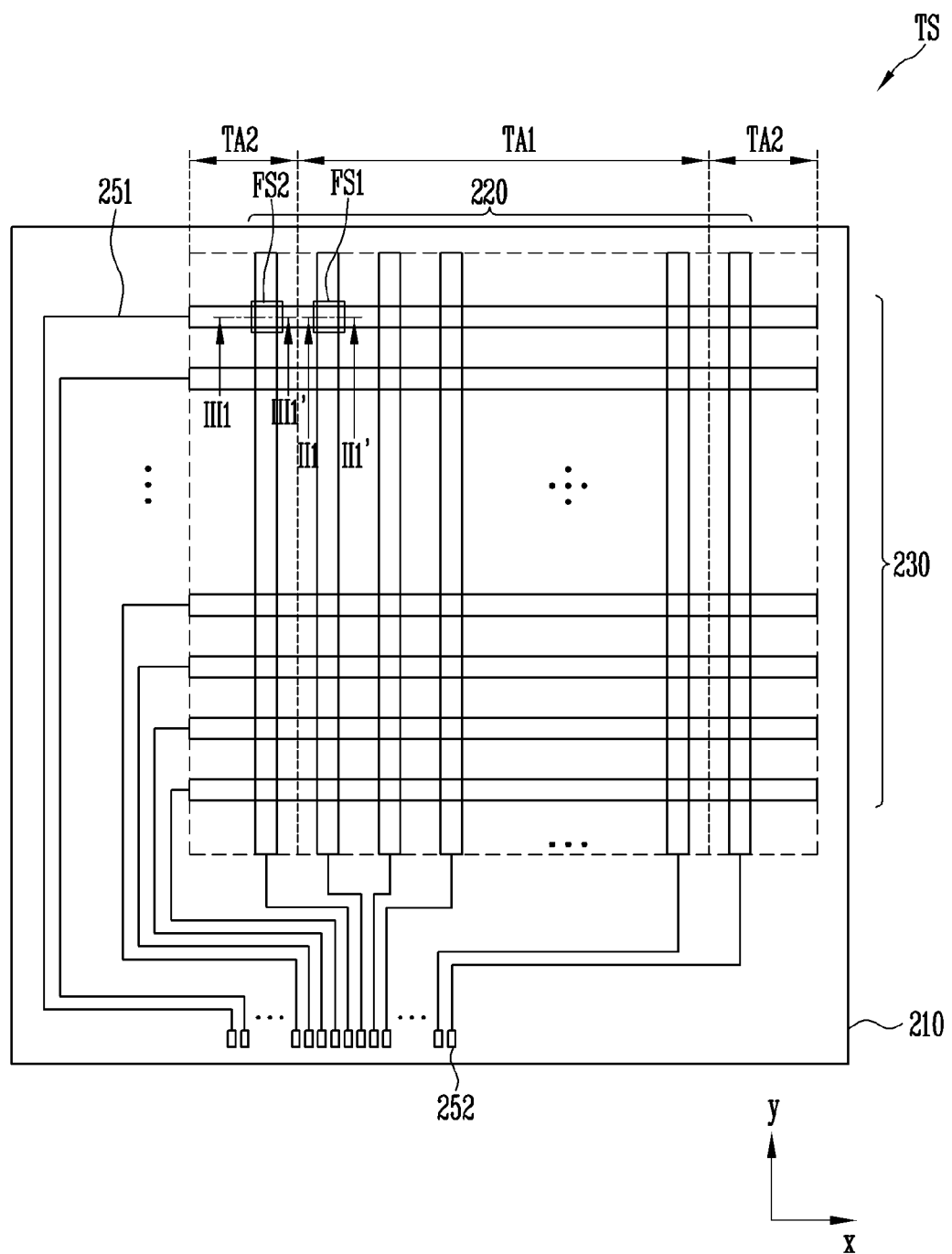
FIG. 5 is a plan view illustrating a touch sensor according to an embodiment of the present disclosure.

FIG. 5 is a plan view illustrating a touch sensor according to an embodiment of the present disclosure.

Referring to FIG. 5, the touch sensor TS according to the embodiment of the present disclosure may include a first sensor substrate 210 and a plurality of electrodes 220 and 230 that are disposed on the first sensor substrate 210. The electrodes 220 and 230 may be provided in touch regions TA1 and TA2.

The first sensor substrate 210 may be made of an insulative material such as glass or resin, and have a single- or multi-layered structure. In addition, the first sensor substrate 210 may be a flexible substrate or a rigid substrate.

The first sensor substrate 210 may be made of at least one of the above-described materials listed as the material constituting the display substrate 110. In addition, the first sensor substrate 210 may be made of the same material as the display substrate 110 or made of a material that is different from that of the display substrate 110.

The touch sensor TS may be configured to have a first touch region TA1 and at least one second touch region TA2.

The first touch region TA1 may have a flat shape, and the second touch region TA2 may have a curved shape that is bent from an edge of the first touch region TA1.

FIG. 5 illustrates an exemplary case where two second touch regions TA2 are provided at both sides of the first touch region TA1, but the present disclosure is not limited thereto. For example, the second touch region TA2 may be disposed at only any one of both sides of the first touch region TA1. Alternatively, the second touch region TA2 may be provided at an upper or lower side of the first touch region TA1.

The electrodes 220 and 230 may include a plurality of first electrodes 220 and a plurality of second electrodes 230 that extend in different directions.

The first electrodes 220 may be disposed on the first sensor substrate 210 and arranged along a first direction (e.g., an X-axis direction).

The second electrodes 230 may be spaced apart from the first electrodes 220 and disposed on the first electrodes 220. The second electrodes 230 may be arranged along a second direction (e.g., a Y-axis direction).

Each of the first and second electrodes 220 and 230 may include a conductive material. In addition, each of the first and second electrodes 220 and 230 may have a single- or multi-layered structure. Further, the first electrodes 220 may be made of the same material as the second electrodes 230 or made of a material that is different from that of the second electrodes 230. In addition, the first and second electrodes 220 and 230 may be plate-shaped electrodes or mesh-shaped electrodes.

Figure 6A:
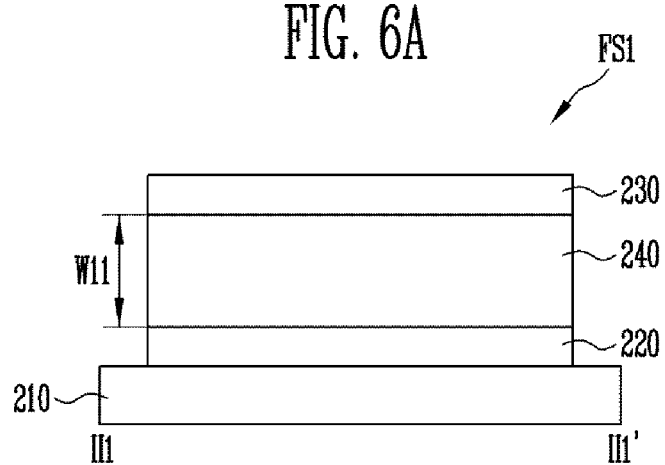
FIG. 6A is a view illustrating an embodiment of a section taken along line II1-III1' of FIG. 5.
Figure 6B:
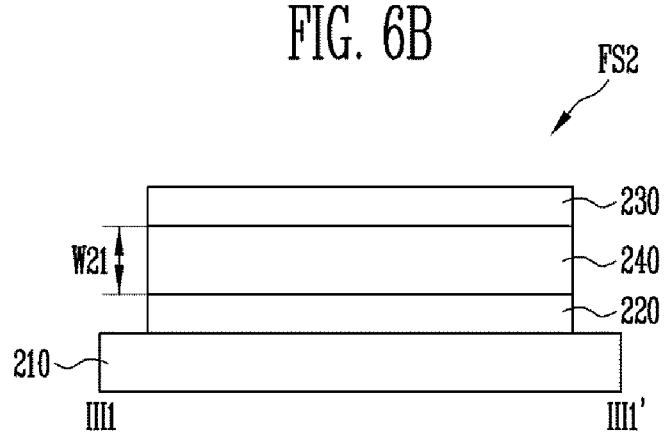
FIG. 6B is a view illustrating an embodiment of a section taken along line III1-III1' of FIG. 5.

Referring to FIGS. 6A and 6B, a pressure sensitive layer 240 may be interposed between the first electrodes 220 and the second electrodes 230.

The pressure sensitive layer (or a force sensitive layer) 240 may be entirely provided on the touch regions TA1 and TA2 or locally provided at only a position at which the first electrode 220 and the second electrode 230 overlap with each other.

In the first touch region TA1, the first electrode 220, the pressure sensitive layer 240, and the second electrode 230 that overlap with one another, may form a first pressure sensor FS1.

In the second touch region TA2, the first electrode 220, the pressure sensitive layer 240, and the second electrode 230 that overlap with one another, may form a second pressure sensor FS2.

When a pressure caused by a touch input is applied to the touch sensor TS, electrical characteristics of one or more pressure sensors FS1 and FS2 disposed in a region to which the touch input is applied or the periphery thereof are changed. The one or more pressure sensors FS1 and FS2 may output, to the sensor controller TSC, a sensing signal that corresponds to the pressure of the touch input, and the sensor controller TSC may detect a position at which the touch input is applied, an intensity of the pressure caused by the touch input by analyzing the sensing signal.

The second touch region TA2 having a curved shape may be formed by forming the pressure sensors FS1 and FS2 and a plurality of lines 251 on the flat first sensor substrate 210 and then bending a region corresponding to the second touch region TA2.

When the second touch region TA2 is in a flat state before being bent, the pressure detection sensitivity of the first pressure sensors FS1 and the pressure detection sensitivity of the second pressure sensors FS2 may be different from each other. For example, the pressure detection sensitivity of the second pressure sensors FS2 that is sensed on a plane, may be larger than that of the first pressure sensors FS1 that is sensed on a plane. In particular, the pressure detection sensitivity of the second pressure sensors FS2 that is sensed on a plane may mean a pressure detection sensitivity when a touch input is applied in a normal direction of the second touch region having a curved shape. In addition, the pressure detection sensitivity of the first pressure sensors FS1 that is sensed on a plane may mean a pressure detection sensitivity when a touch input is applied in a normal direction of the first touch region (i.e., the direction perpendicular to the first touch region) having a flat shape. Therefore, the pressure detection sensitivity of the second pressure sensors FS2 when the touch input is applied in the normal direction of the second touch region may be larger than that of the first pressure sensors FS1 when the touch input is applied in the direction perpendicular to the first touch region. The above-described meaning of the pressure detection sensitivity can be equally applied to other embodiments that will be described below.

The pressure detection sensitivity of the second pressure sensor being large may mean that, when the same force is applied to the first and second pressure sensors, the second pressure sensor outputs a sensing signal having a magnitude larger than that of a sensing signal output by the first pressure sensor.

After the second touch region TA2 is bent to have a curved shape, the pressure detection sensitivity of the first pressure sensors FS1 and the pressure detection sensitivity of the second pressure sensors FS2 may become substantially equal or similar to each other.

To this end, the first pressure sensors FS1 and the second pressure sensors FS2 may be different from each other. In particular, the structure of the first pressure sensors FS1 and the structure of the second pressure sensors FS2 may be different from each other. Here, the 'structures' that are different from each other may mean that components constituting the pressure sensors FS1 and FS2 are different from each other. For example, this may mean a case where the shapes of at least one of the components constituting the pressure sensors FS1 and FS2 are different from each other, a case where the stacking orders of the components constituting the pressure sensors FS1 and FS2 are different from each other, or a case where the areas, thickness, volumes, etc. of at least one of the components constituting the pressure sensors FS1 and FS2 are different from each other. The above-described meaning of the structure can be equally applied to other embodiments which will be described below.

The first pressure sensors FS1 may be disposed in the first touch region TA1. The first pressure sensors FS1 may be provided in a dot shape. The first pressure sensors FS1 may be separated from each other and arranged in a matrix form along the first direction (e.g., the X-axis direction) and the second direction (e.g., the Y-axis direction).

Although not shown in the drawing, at least one line may be connected to each of the first pressure sensors FS1 such that the first pressure sensors FS1 are supplied with a driving signal from the sensor controller TSC and transmit a sensing signal to the sensor controller TSC. The line may electrically connect the first pressure sensor FS1 and the sensor controller TSC.

The second pressure sensors FS2 may be disposed in the second touch region TA2. The second pressure sensors FS2 may be provided in a dot shape. The second pressure sensors FS2 may be separated from each other and arranged in a matrix form along the first direction (e.g., the X-axis direction) and the second direction (e.g., the Y-axis direction).

Although not shown in the drawing, at least one line may be connected to each of the second pressure sensors FS2 such that the second pressure sensors FS2 are supplied with a driving signal from the sensor controller TSC and transmit a sensing signal to the sensor controller TSC. The line may electrically connect the second pressure sensor FS2 and the sensor controller TSC.

FIG. 5 illustrates that, in one second touch region TA2, the second pressure sensors FS2 are arranged along one column, but the present disclosure is not limited thereto. For example, the second pressure sensors FS2 may be arranged to form a plurality of rows and a plurality of columns in each second touch region TA2.

One or more lines 251 may be connected to each of the first sensor electrodes 220 and the second sensor electrodes 230. Each of the lines 251 may be connected to an external driving circuit through at least one pad 252. For example, the first sensor electrodes 220 and the second sensor electrodes 230 may be connected to the above-described sensor controller TSC through the lines 251 and the pads 252.

A driving voltage may be applied to at least one of the first sensor electrodes 220 and the second sensor electrodes 230, and a sensing signal corresponding to the driving voltage may be output from the other of the first sensor electrodes 220 and the second sensor electrodes 230. The presence of a touch input, a position of the touch input, and a pressure caused by the touch input can be detected by analyzing the sensing signal.

FIG. 6A is a view illustrating an embodiment of a section taken along line II1-II1' of FIG. 5. FIG. 6B is a view illustrating an embodiment of a section taken along line III1-III1' of FIG. 5.

Referring to FIGS. 5, 6A, and 6B, each of the first pressure sensors FS1 and the second pressure FS2 may include a first electrode 220, a second electrode 230, and a pressure sensitive layer 240 that is interposed between the first electrode 220 and the second electrode 230.

The first electrode 220 may be provided on the first sensor substrate 210, and include a conductive material. In an embodiment of the present disclosure, the conductive material may include a metal or an alloy of metals. The metal(s) may include gold (Au), silver (Ag), aluminum (Al), molybdenum (Mo), chromium (Cr), titanium (Ti), nickel (Ni), neodymium (Nd), copper (Cu), platinum (Pt), and the like.

In addition, when the touch sensor TS is disposed on the display panel DP, the first electrode 220 may be made of a transparent conductive material such that an image output from the display panel DP can be viewed through the first electrode 220. The transparent conductive material may include silver nanowire (AgNW), indium tin oxide (ITO), indium zinc oxide (IZO), antimony zinc oxide (AZO), indium tin zinc oxide (ITZO), zinc oxide (ZnO), tin oxide ($SnO_2$), carbon nano tube, graphene, and the like.

The second electrode 230 may be disposed on the first electrode 220 as being spaced apart from the first electrode 220.

The second electrode 230 may include a conductive material, and the conductive material may be selected from the materials constituting the first electrode 220. The second electrode 230 may be made of the same material as the first electrode 220 or be made of a material that is different from that of the first electrode 220.

Although not shown in the drawings, a second sensor substrate that supports the second electrode 230 may be provided on the second electrode 230.

The pressure sensitive layer 240 may be interposed between the first electrode 220 and the second electrode 230. The pressure sensitive layer 240 may be entirely provided on the touch regions TA1 and TA2 or locally provided at only a position at which the first electrode 220 and the second electrode 230 overlap with each other.

The pressure sensitive layer 240 may have a single- or multi-layered structure.

The pressure sensitive layer 240 may change its electrical characteristics under physical deformation. In particular, the pressure sensitive layer 240 may include a material that is disposed between the first electrode 220 and the second electrode 230 and has a resistance that is changed depending on a pressure from a touch input.

For example, as a touch input applied to the pressure sensitive layer 240 increases, the resistance between the first electrode 220 and the second electrode 230 may decrease. Alternatively, on the contrary, as a touch input applied to the pressure sensitive layer 240 increases, the resistance between the first electrode 220 and the second electrode 230 may increase.

To this end, the pressure sensitive layer 240 may include a material that is designated as a pressure sensitive material or a pressure sensitive resistor.

Examples of the pressure sensitive material may include nano particles, graphene, a quantum tunneling composite (QTC), and the like, but the present disclosure is not limited thereto. The nano particles may be provided in the form of a nano tube, a nano column, a nano rod, a nano pore, a nano wire, etc. In addition, in some embodiments, the nano particles may be provided as being distributed in a polymer.

The nano particles may include particles of carbon, graphite, a metalloid, a metal, a conductive oxide of the metalloid or the metal, and a conductive nitride of the metalloid or the metal, or include particles in a core shell structure, in which the particles are coated on an insulating bead, or a combination thereof. The metalloid may include any one of antimony (Sb), germanium (Ge), and arsenic (As), or an alloy thereof. The metal may include a zinc (Zn), aluminum (Al), scandium (Sc), chrome (Cr), manganese (Mn), iron (Fe), cobalt (Co), nickel (Ni), copper (Cu), indium (In), tin (Sn), yttrium (Y), zirconium (Zr), niobium (Nb), molybdenum (Mo), ruthenium (Ru), rhodium (Rh), palladium (Pd), gold (Au), silver (Ag), platinum (Pt), strontium (Sr), tungsten (W), cadmium (Cd), tantalum (Ta), titanium (Ti), or an alloy thereof. The conductive oxide may include an indium tin oxide (ITO), an indium zinc oxide (IZO), an aluminum doped zinc oxide (AZO), a gallium indium zinc oxide (GIZO), a zinc oxide (ZnO), and a mixture thereof.

When a touch input (e.g., a pressure caused by the touch input) is applied to the pressure sensors FS1 and FS2, the electron transfer probability is changed as a tunnel effect among nano particles included in the pressure sensitive layer 240. Accordingly, the resistance of the pressure sensitive layer 240 is changed. Thus, an intensity of the pressure, etc. can be detected by detecting a change in resistance of the pressure sensitive layer 240.

Referring to FIGS. 6A and 6B, the thickness W11 of the pressure sensitive layer 240 that is provided in each of the first pressure sensors FS1 may be larger than that W21 of the pressure sensitive layer 240 that provided in each of the second pressure sensors FS2.

As the thickness of the pressure sensitive layer 240 becomes thicker, a current path between the first electrode 220 and the second electrode 230 becomes longer, and the pressure detection sensitivity becomes lower.

Therefore, the pressure detection sensitivity of the second pressure sensors FS2 may be larger than that of the first pressure sensors FS1.

In this case, the contact area between the pressure sensitive layer 240 included in each of the first pressure sensors FS1 and the first or second electrode 220 or 230 may be equal to or smaller than that between the pressure sensitive layer 240 included in each of the second pressure sensors FS2 and the first electrode 220 or the second electrode 230.

Figure 7:
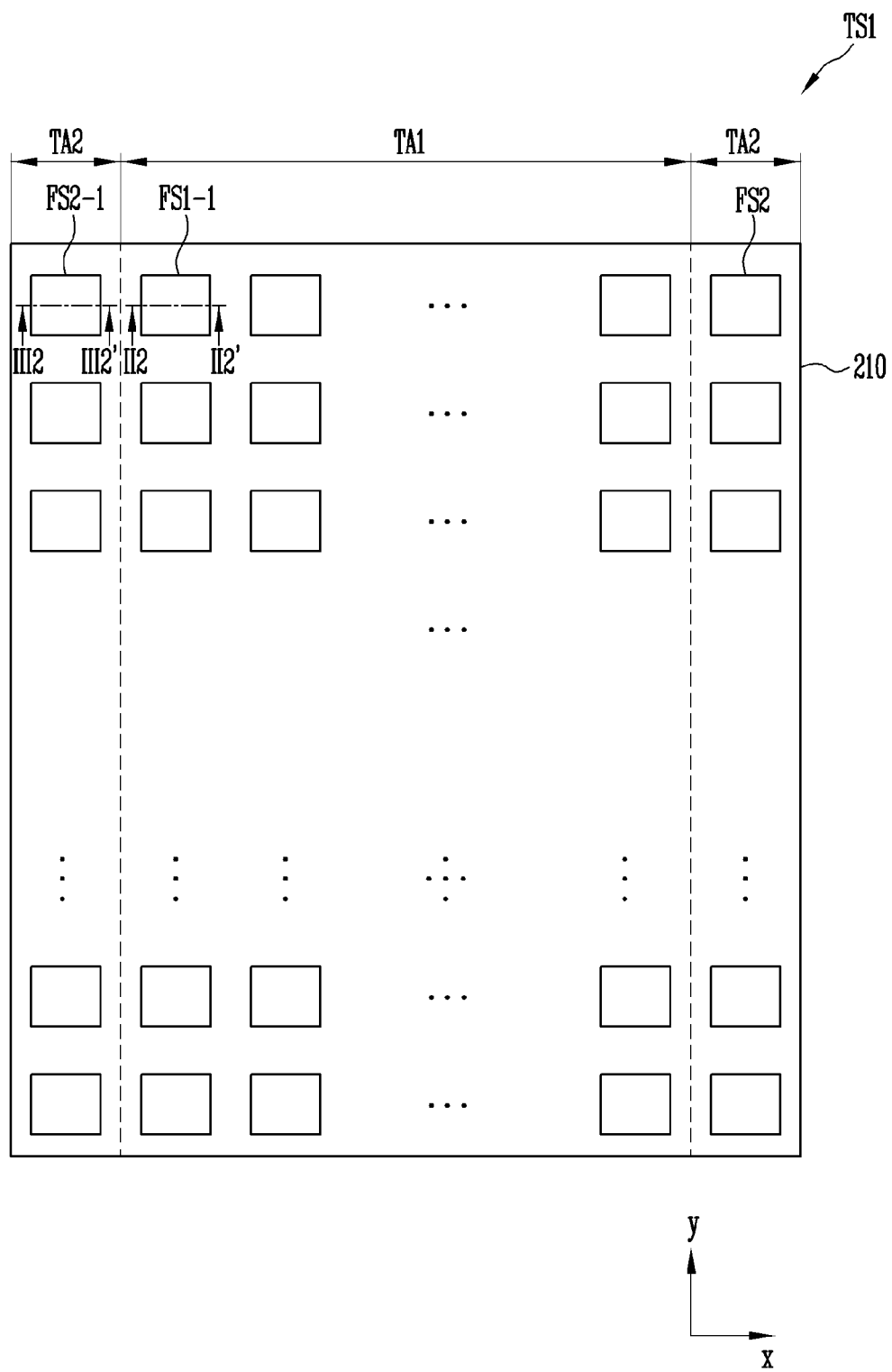
FIG. 7 is a plan view illustrating a touch sensor according to another embodiment of the present disclosure.

FIG. 7 is a plan view illustrating a touch sensor according to another embodiment of the present disclosure.

Referring to FIG. 7, the touch sensor TS1 according to the embodiment of the present disclosure may include a first sensor substrate 210 and a plurality of pressure sensors FS1-1 and FS2-1 disposed on the first sensor substrate 210.

The first sensor substrate 210 may be made of an insulative material such as glass or resin, and have a single- or multi-layered structure. In addition, the first sensor substrate 210 may be a flexible substrate or a rigid substrate.

The first sensor substrate 210 may be made of at least one of the above-described materials listed as the material constituting the display substrate 110. In addition, the first sensor substrate 210 may be made of the same material as the display substrate 110 or made of a material that is different from that of the display substrate 110.

The touch sensor TS may be configured to have a first touch region TA1 and at least one second touch region TA2.

The first touch region TA1 may have a flat shape, and the second touch region TA2 may have a curved shape that is bent from an edge of the first touch region TA1.

First pressure sensors FS1-1 may be disposed in the first touch region TA1. The first pressure sensors FS1-1 may be provided in a dot shape. The first pressure sensors FS1-1 may be separated from each other and arranged in a matrix form along a first direction (e.g., an X-axis direction) and a second direction (e.g., a Y-axis direction).

Although not shown in the drawing, at least one line may be connected to each of the first pressure sensors FS1-1 such that the first pressure sensors FS1-1 are supplied with a driving signal from the sensor controller TSC and transmit a sensing signal to the sensor controller TSC. The line may electrically connect the first pressure sensor FS1-1 and the sensor controller TSC.

Second pressure sensors FS2-1 may be disposed in the second touch region TA2. The second pressure sensors FS2-1 may be provided in a dot shape. The second pressure sensors FS2-1 may be separated from each other and arranged in a matrix form along the first direction (e.g., the X-axis direction) and the second direction (e.g., the Y-axis direction).

Although not shown in the drawing, at least one line may be connected to each of the second pressure sensors FS2-1 such that the second pressure sensors FS2-1 are supplied with a driving signal from the sensor controller TSC and transmit a sensing signal to the sensor controller TSC. The line may electrically connect the second pressure sensor FS2-1 and the sensor controller TSC.

FIG. 7 illustrates that, in one second touch region TA2, the second pressure sensors FS2-1 are arranged along one column, but the present disclosure is not limited thereto. For example, the second pressure sensors FS2-1 may be arranged to form a plurality of rows and a plurality of columns in each second touch region TA2.

When the second touch region TA2 is in a flat state before being bent, the pressure detection sensitivity of the first pressure sensors FS1-1 and the pressure detection sensitivity of the second pressure sensors FS2-1 may be different from each other. For example, the pressure detection sensitivity of the second pressure sensors FS2-1 may be larger than that of the first pressure sensors FS1-1.

After the second touch region TA2 is bent to have a curved shape, the pressure detection sensitivity of the first pressure sensors FS1-1 and the pressure detection sensitivity of the second pressure sensors FS2-1 may become substantially equal or similar to each other.

To this end, the first pressure sensors FS1-1 and the second pressure sensors FS2-1 may be different from each other.

Figure 8A:
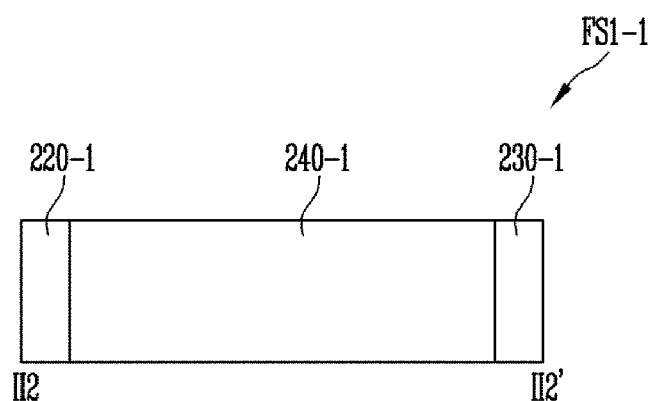
FIGS. 8A and 8B are views illustrating a configuration of a first pressure sensor shown in FIG. 7.
Figure 8B:
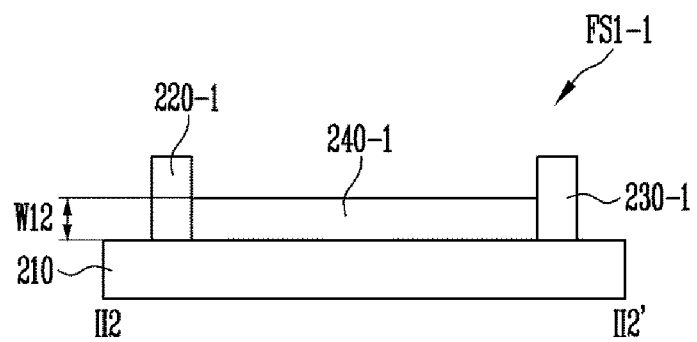
Figure 9A:
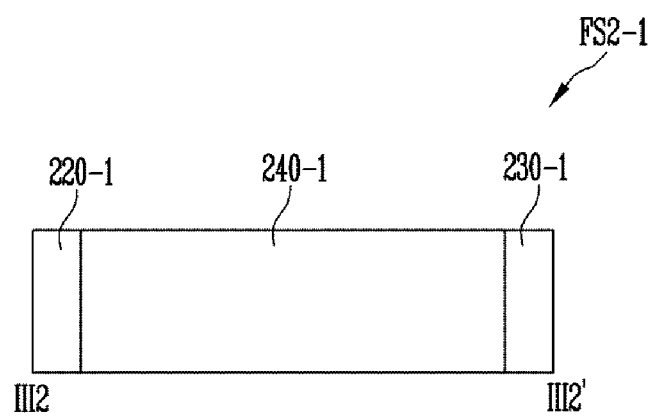
FIGS. 9A and 9B are views illustrating a configuration of a second pressure sensor shown in FIG. 7.
Figure 9B:
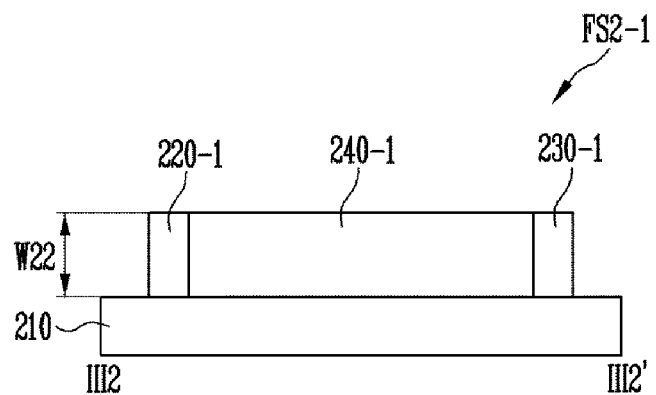

FIGS. 8A and 8B are views illustrating a configuration of the first pressure sensor shown in FIG. 7. FIGS. 9A and 9B are views illustrating a configuration of the second pressure sensor shown in FIG. 7.

In particular, FIG. 8A is a plan view illustrating a configuration of the first pressure sensor, and FIG. 8B is a view illustrating a section taken along line II2-II2' of FIG. 7. In addition, FIG. 9A is a plan view illustrating a configuration of the second pressure sensor, and FIG. 9B is a view illustrating a section taken along line III2-III2' of FIG. 7.

Referring to FIGS. 7 to 9B, each of the first pressure sensors FS1-1 and the second pressure sensors FS2-1 may include a first electrode 220-1, a second electrode 230-1, and a pressure sensitive layer 240-1 that is interposed between the first electrode 220-1 and the second electrode 230-1.

The first electrode 220-1 may be provided on the first sensor substrate 210, and include a conductive material. The conductive material may be selected from the materials constituting the first electrode 220 shown in FIGS. 6A and 6B.

The second electrode 230-1 may be disposed on the first sensor substrate 210 and spaced apart from the first electrode 220-1.

The second electrode 230-1 may include a conductive material, and the conductive material may be selected from the materials constituting the first electrode 220 shown in FIGS. 6A and 6B.

The pressure sensitive layer 240-1 may be provided on the first sensor substrate 210 and interposed between the first electrode 220-1 and the second electrode 230-1. That is, the first electrode 220-1, the pressure sensitive layer 240-1, and the second electrode 230-1 may be disposed on the same plane.

Similar to the pressure sensitive layer 240 shown in FIGS. 6A and 6B, the pressure sensitive layer 240-1 may change its electrical characteristics under physical deformation.

To this end, the pressure sensitive layer 240-1 may include a material that is designated as a pressure sensitive material or a pressure sensitive resistor. The pressure sensitive material 240-1 may be selected from the materials constituting the pressure sensitive layer 240.

Referring to FIGS. 8B and 9B, the thickness W12 of the pressure sensitive layer 240-1 that is provided in each of the first pressure sensors FS1-1 may be larger than that W22 of the pressure sensitive layer 240-1 that is provided in each of the second pressure sensors FS2-1.

As the thickness of the pressure sensitive layer 240-1 between the first electrode 220-1 and the second electrode 230-1 that are disposed on the same plane becomes smaller, a current path between the first electrode 220-1 and the second electrode 230-1 becomes narrower, and the pressure detection sensitivity becomes lower.

Therefore, the pressure detection sensitivity of the second pressure sensors FS2-1 may be larger than that of the first pressure sensors FS1-1.

In this case, the distance between the first and second electrodes 220-1 and 230-1 included in each of the first pressure sensors FS1-1 may be equal to or larger than that between the first and second electrodes 220-1 and 230-1 included in each of the second pressure sensors FS2-1.

FIGS. 10A to 10D are plan views illustrating another embodiment of the pressure sensor shown in FIG. 7.

Figure 10A:
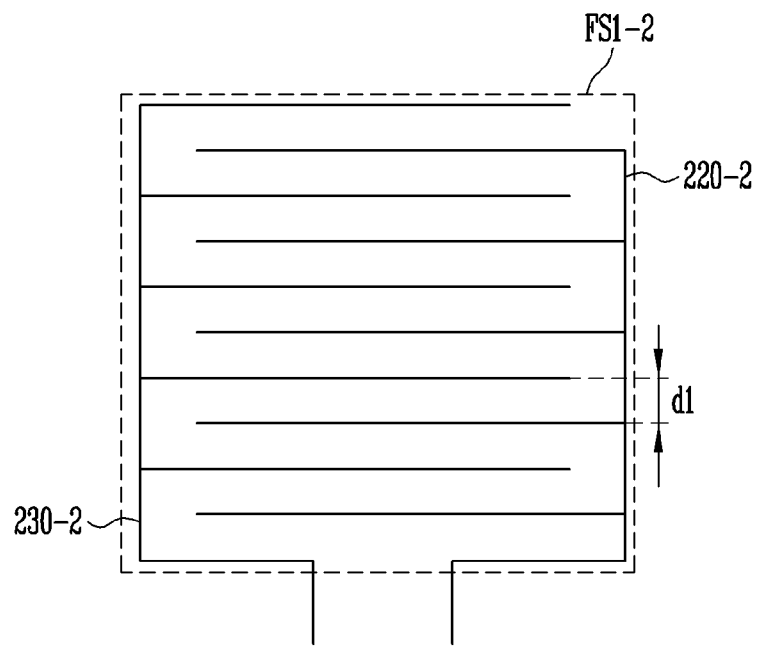
FIGS. 10A, 10B, 10C and 10D are plan views illustrating another embodiment of a pressure sensor shown in FIG. 7.
Figure 10B:
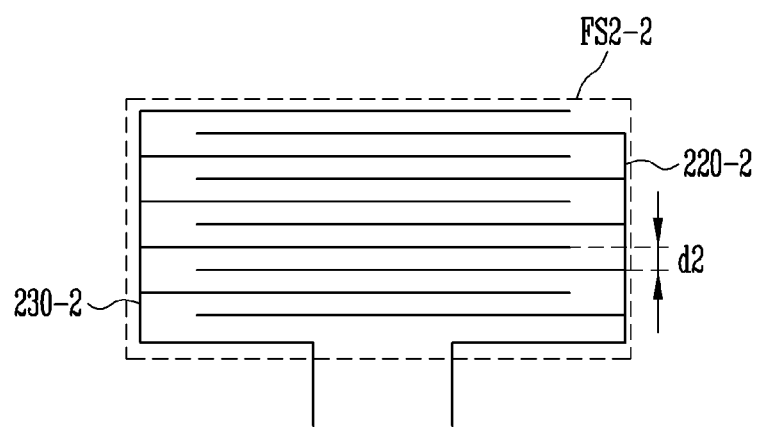
Figure 10C:
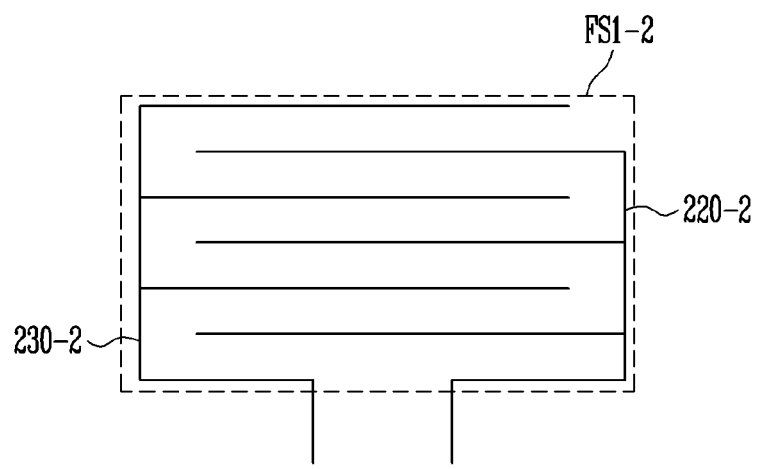
Figure 10D:
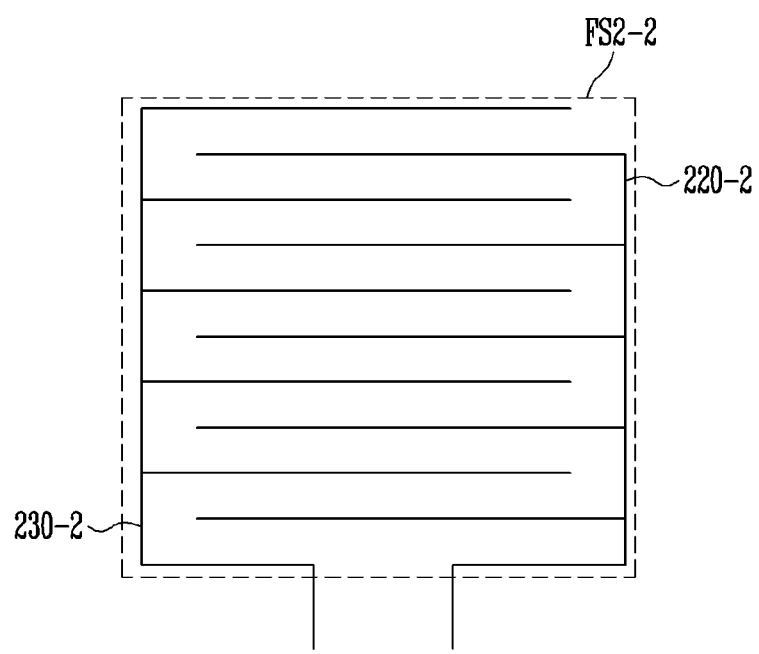

In particular, FIGS. 10A and 10C specifically illustrate a configuration of a first pressure sensor FS1-2 according to another embodiment of the present disclosure, and FIGS. 10B and 10D specifically illustrate a configuration of a second pressure sensor FS2-2 according to another embodiment of the present disclosure.

Referring to FIGS. 10A to 10D, each of the first and second pressure sensors FS1-2 and FS2-2 may include a first electrode 220-2 and a second electrode 230-2.

The first electrode 220-2 and the second electrode 230-2 may have a comb shape (or structure). In this case, comb teeth of the first electrode 220-2 and comb teeth of the second electrode 230-2 may be spaced apart from each other and alternately disposed.

Each of the first and second pressure sensors FS1-2 and FS2-2 may include a pressure sensitive layer. The pressure sensitive layer may be provided to cover the first electrode 220-2, the second electrode 230-2, and the space between the first electrode 220-2 and the second electrode 230-2.

When the second touch region TA2 is in a flat state before being bent, the pressure detection sensitivity of the first pressure sensors FS1-2 and the pressure detection sensitivity of the second pressure sensors FS2-2 may be different from each other. For example, the pressure detection sensitivity of the second pressure sensors FS2-2 may be larger than that of the first pressure sensors FS1-2.

To this end, as shown in FIGS. 10A and 10B, the distance d1 between comb teeth of the first and second electrodes 220-2 and 230-2 included in the first pressure sensor FS1-2 may be larger than that the distance d2 between comb teeth of the first and second electrodes 220-2 and 230-2 included in the second pressure sensor FS2-2.

As the distance between the comb teeth of the first and second electrodes 220-2 and 230-2 becomes larger, a current path between the first electrode 220-2 and the second electrode 230-2 becomes longer, and the pressure detection sensitivity becomes lower.

Therefore, the pressure detection sensitivity of the second pressure sensors FS2-2 may be larger than that of the first pressure sensors FS1-2.

Alternatively, as shown in FIGS. 10C and 10D, the first and second pressure sensors FS1-2 and FS2-2 are formed such that the number of comb teeth of the first and second electrodes 220-2 and 230-2 included in the second pressure sensor FS2-2 is larger than that of comb teeth of the first and second electrodes 220-2 and 230-2 included in the first pressure sensor FS1-2, so that the pressure detection sensitivity of the second pressure sensor FS2-2 is larger than the pressure detection sensitivity of the first pressure sensor FS1-2.

Meanwhile, FIGS. 10A to 10D illustrate that when either the distance between comb teeth of the electrodes 220-2 and 230-2 or the number of comb teeth of the electrodes 220-2 and 230-2 is changed, the pressure detection sensitivity is changed, but the present disclosure is not limited thereto. For example, the pressure detection sensitivity may be changed by changing the distance between comb teeth of the electrodes 220-2 and 230-2 as well as the number of comb teeth of the electrodes 220-2 and 230-2.

Figure 11:
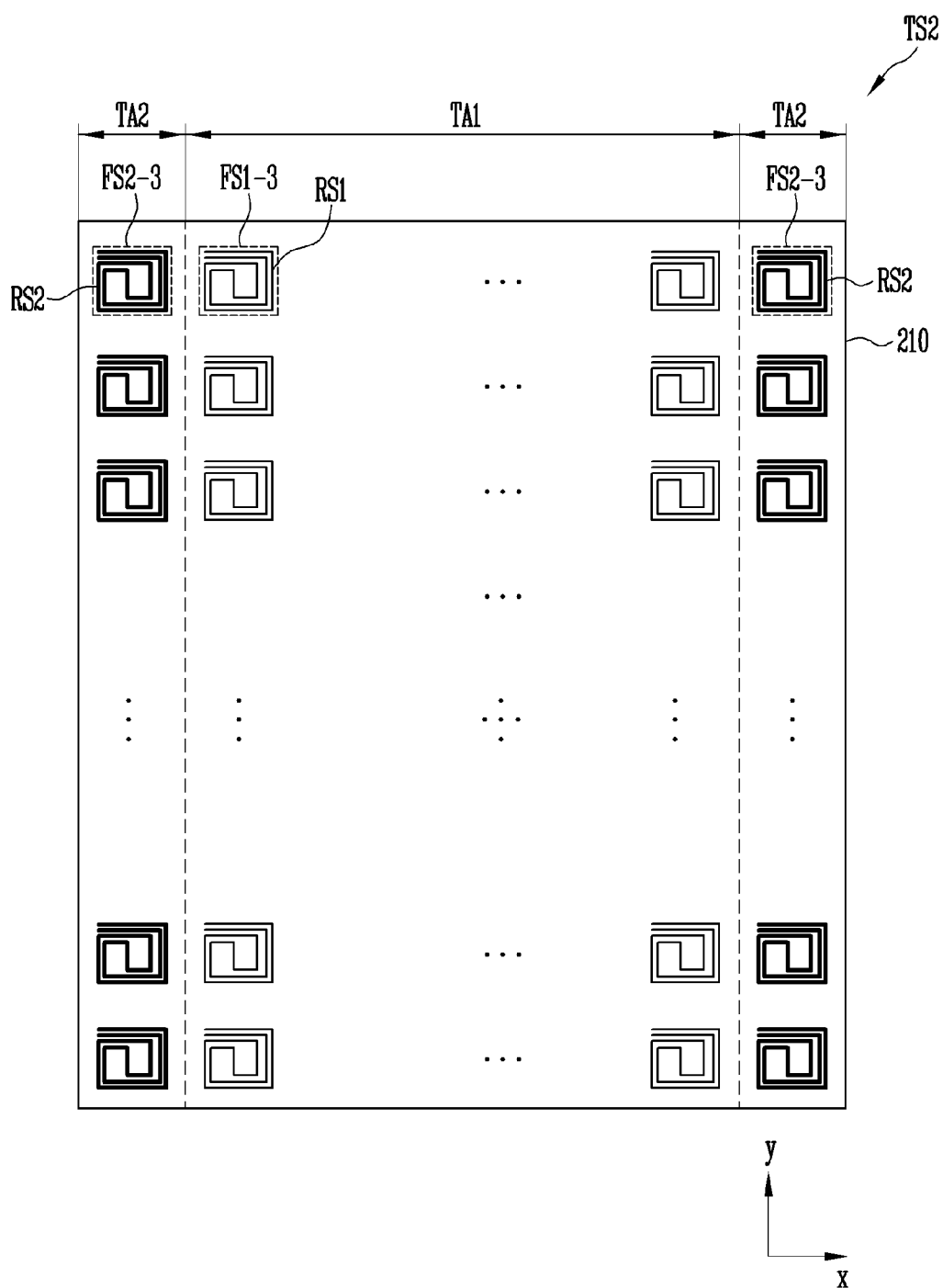
FIG. 11 is a plan view illustrating a touch sensor according to another embodiment of the present disclosure.

FIG. 11 is a plan view illustrating a touch sensor according to another embodiment of the present disclosure.

Referring to FIG. 11, the touch sensor TS2 according to the embodiment of the present disclosure may include a first sensor substrate 210 and a plurality of pressure sensors FS1-3 and FS2-3 disposed on the first sensor substrate 210.

The first sensor substrate 210 may be made of an insulative material such as glass or resin, and have a single- or multi-layered structure. In addition, the first sensor substrate 210 may be a flexible substrate or a rigid substrate.

The first sensor substrate 210 may be made of at least one of the above-described materials listed as the material constituting the display substrate 110. In addition, the first sensor substrate 210 may be made of the same material as the display substrate 110 or made of a material that is different from that of the display substrate 110.

The touch sensor TS2 may be configured to have a first touch region TA1 and at least one second touch region TA2.

The first touch region TA1 may have a flat shape, and the second touch region TA2 may have a curved shape that is bent from an edge of the first touch region TA1.

Meanwhile, FIG. 11 illustrates a case where two second touch regions TA2 are provided at both sides of the first touch region TA1, but the present disclosure is not limited thereto. For example, the second touch region TA2 may be disposed at only any one of both the sides of the first touch region TA1. Alternatively, the second touch region TA2 may be provided at an upper or lower side of the first touch region TA1.

First pressure sensors FS1-3 may be disposed in the first touch region TA1. The first pressure sensors FS1-3 may be provided in a dot shape. The first pressure sensors FS1-3 may be separated from each other and arranged in a matrix form along the first direction (e.g., the X-axis direction) and the second direction (e.g., the Y-axis direction).

Each of the first pressure sensors FS1-3 may have a first resistance sensing line RS1, and the first resistance sensing line RS1 may have a shape in which at least a portion thereof is bent. For example, as shown in FIG. 11, the first resistance sensing line RS1 may have a shape in which it is wound in a predetermined region. However, the present disclosure is not limited thereto, and the first resistance sensing line RS1 may have a zigzag shape.

However, the shape of the first resistance sensing line RS1 is not limited to that shown in FIG. 11. When the first resistance sensing line RS1 has a strain gauge structure to detect a small displacement, the shape of the first resistance sensing line RS1 may be variously changed.

The first resistance sensing line RS1 may include a conductive material that is sensitive to a pressure change.

Examples of the conductive material may include nano particles, graphene, and the like, but the present disclosure is not limited thereto. The nano particles may be provided in the form of a nano tube, a nano column, a nano rod, a nano pore, a nano wire, etc.

The nano particles may include particles of carbon, graphite, a metalloid, a metal, a conductive oxide of the metalloid or the metal, and a conductive nitride of the metalloid or the metal, or include particles in a core shell structure, in which the particles are coated on an insulating bead, or a combination thereof. The metalloid may include any one of antimony (Sb), germanium (Ge), and arsenic (As), or an alloy thereof. The metal may include a zinc (Zn), aluminum (Al), scandium (Sc), chrome (Cr), manganese (Mn), iron (Fe), cobalt (Co), nickel (Ni), copper (Cu), indium (In), tin (Sn), yttrium (Y), zirconium (Zr), niobium (Nb), molybdenum (Mo), ruthenium (Ru), rhodium (Rh), palladium (Pd), gold (Au), silver (Ag), platinum (Pt), strontium (Sr), tungsten (W), cadmium (Cd), tantalum (Ta), titanium (Ti), or an alloy thereof. The conductive oxide may include an indium tin oxide (ITO), an indium zinc oxide (IZO), an aluminum doped zinc oxide (AZO), a gallium indium zinc oxide (GIZO), a zinc oxide (ZnO), and a mixture thereof.

The first resistance sensing line RS1 may include a piezoelectric material that exhibits a piezoelectric effect according to a pressure applied by a touch input. Examples of the piezoelectric material may be lead zirconate titanate (PZT), polyvinylidene fluoride (PVDF), barium titanate (BaTiO$_3$), polytrifluoroethylene (PTrFE), and the like. In addition, the piezoelectric material may be a piezoelectric semiconductor material such as poly crystal, PMN-PT single crystal, zinc oxide (ZnO), and molybdenum disulphide (MoS$_2$). However, the first resistance sensing line RS1 is not limited thereto, and the first resistance sensing line RS1 may be made of a different piezoelectric material other than the above-described material.

Although not shown in the drawing, at least one line may be connected to each of the first pressure sensors FS1-3 such that the first pressure sensors FS1-3 are supplied with a driving signal from the sensor controller TSC and transmit a sensing signal to the sensor controller TSC. The line may electrically connect the first pressure sensor FS1-3 and the sensor controller TSC.

Second pressure sensors FS2-3 may be disposed in the second touch region TA2. The second pressure sensors FS2-3 may be provided in a dot shape. The second pressure sensors FS2-3 may be separated from each other and arranged in a matrix form along the first direction (e.g., the X-axis direction) and the second direction (e.g., the Y-axis direction).

Each of the second pressure sensors FS2-3 may be configured to have a second resistance sensing line RS2, and the second resistance sensing line RS2 may have a shape in which at least a portion thereof is bent. For example, as shown in FIG. 11, the second resistance sensing line RS2 may have a shape in which it is wound in a predetermined region. However, the present disclosure is not limited thereto, and the second resistance sensing line RS2 may have a zigzag shape.

The second resistance sensing line RS2 may have the same shape as the first resistance sensing line RS1 or have a shape that is different from that of the first resistance sensing line RS1.

The second resistance sensing line RS2 may be made of at least one of the above-described materials listed as the material constituting the first resistance sensing line RS1. In addition, the second resistance sensing line RS2 may be made of the same material as the first resistance sensing line RS1 or made of a material that is different from that of the first resistance sensing line RS1.

Although not shown in the drawing, at least one line may be connected to each of the second pressure sensors FS2-3 such that the second pressure sensors FS2-3 are supplied with a driving signal from the sensor controller TSC and transmit a sensing signal to the sensor controller TSC. The line may electrically connect the second pressure sensor FS2-3 and the sensor controller TSC.

FIG. 11 illustrates that, in one second touch region TA2, the second pressure sensors FS2-3 are arranged along one column, but the present disclosure is not limited thereto. For example, the second pressure sensors FS2-3 may be arranged to form a plurality of rows and a plurality of columns in each second touch region TA2.

When a pressure caused by a touch input is applied to the touch sensor TS2, electrical characteristics of one or more pressure sensors FS1-3 and FS2-3 disposed in a region to which the touch input is applied or the periphery thereof are changed.

More specifically, as the length or a sectional area of the resistance sensing lines RS1 or RS2 are changed by the pressure of the touch input, the resistance value of a corresponding pressure sensor FS1-3 or FS2-3 is changed. Thus, the corresponding pressure sensor FS1-3 or FS2-3 outputs, to the sensor controller TSC, a sensing signal that corresponds to the changed resistance value, and the sensor controller TSC can detect a position at which the touch input is applied, an intensity of the pressure caused by the touch input by analyzing the sensing signal.

When the second touch region TA2 is in a flat state before being bent, the pressure detection sensitivity of the first pressure sensors FS1-3 and the pressure detection sensitivity of the second pressure sensors FS2-3 may be different from each other. For example, the pressure detection sensitivity of the second pressure sensors FS2-3 may be larger than that of the first pressure sensors FS1-3.

After the second touch region TA2 is bent to have a curved shape, the pressure detection sensitivity of the first pressure sensors FS1-3 and the pressure detection sensitivity of the second pressure sensors FS2-3 may become substantially equal or similar to each other.

To this end, the first pressure sensors FS1-3 and the second pressure sensors FS2-3 may be different from each other.

For example, the thickness of the first resistance sensing line RS1 included in the first pressure sensors FS1-3 may be smaller than that of the second resistance sensing line RS2 included in the second pressure sensors FS2-3.

Figure 12:
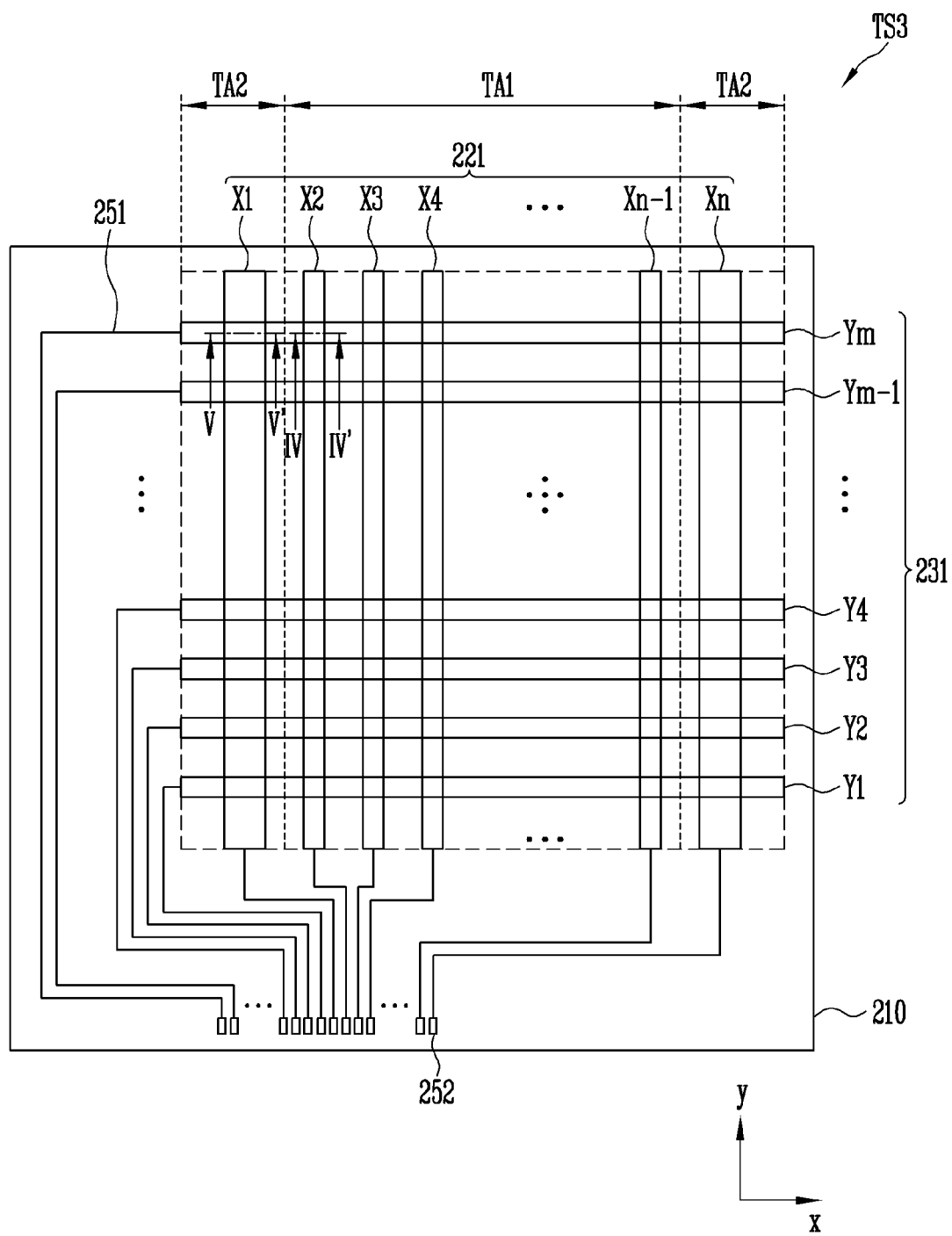
FIG. 12 is a plan view illustrating a touch sensor according to another embodiment of the present disclosure.
Figure 13:
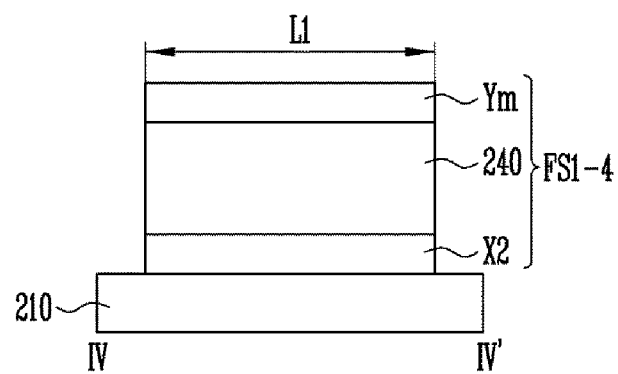
FIG. 13 is a view illustrating an embodiment of a section taken along line IV-IV' of FIG. 12.
Figure 14:
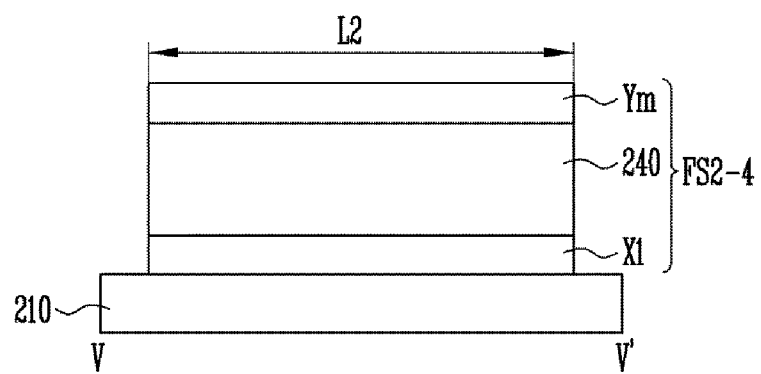
FIG. 14 is a view illustrating an embodiment of a section taken along line V-V' of FIG. 12.

FIG. 12 is a plan view illustrating a touch sensor according to another embodiment of the present disclosure. FIG. 13 is a view illustrating an embodiment of a section taken along line IV-IV' of FIG. 12. FIG. 14 is a view illustrating an embodiment of a section taken along line V-V' of FIG. 12.

Referring to FIGS. 12 to 14, the touch sensor TS3 according to the embodiment of the present disclosure may include a first sensor substrate 210 and a plurality of sensor electrodes 221 and 231 that are disposed on the first sensor substrate 210. The sensor electrodes 221 and 231 may be provided in touch regions TA1 and TA2.

The first sensor substrate 210 may be made of an insulative material such as glass or resin, and have a single- or multi-layered structure. In addition, the first sensor substrate 210 may be a flexible substrate or a rigid substrate.

The first sensor substrate 210 may be made of at least one of the above-described materials listed as the material constituting the display substrate 110. In addition, the first sensor substrate 210 may be made of the same material as the display substrate 110 or made of a material that is different from that of the display substrate 110.

The touch sensor TS2 may be configured to have a first touch region TA1 and at least one second touch region TA2.

The first touch region TA1 may have a flat shape, and the second touch region TA2 may have a curved shape that is bent from an edge of the first touch region TA1.

Meanwhile, FIG. 12 illustrates a case where two second touch regions TA2 are provided at both sides of the first touch region TA1, but the present disclosure is not limited thereto. For example, the second touch region TA2 may be disposed at only any one of both the sides of the first touch region TA1. Alternatively, the second touch region TA2 may be provided at an upper or lower side of the first touch region TA1.

The sensor electrodes 221 and 231 may include a plurality of first sensor electrodes 221 and a plurality of second sensor electrodes 231 that extend in different directions.

The first sensor electrodes 221 may be disposed on the first sensor substrate 210 and arranged along a first direction (e.g., an X-axis direction).

The width L2 of first sensor electrodes X1 and Xn provided in the second touch region TA2 among the first sensor electrodes 221 may be larger than the width L1 of first sensor electrodes X2 to Xn−1 provided in the first touch region TA1.

The second sensor electrodes 231 may be spaced apart from the first sensor electrodes 221 and disposed on the first sensor electrodes 221. The second sensor electrodes 231 may be arranged along a second direction (e.g., a Y-axis direction).

Each of the first sensor electrodes 221 and the second sensor electrodes 231 may include a conductive material. In addition, each of the first sensor electrodes 221 and the second sensor electrodes 231 may have a single- or multi-layered structure. Further, the first sensor electrodes 221 may be made of the same material as the second sensor electrodes 231 or made of a material that is different from that of the second sensor electrodes 231. In addition, the first sensor electrodes 221 and the second sensor electrodes 231 may be plate-shaped electrodes or mesh-shaped electrodes. The conductive material may be selected from the materials constituting the first electrode 220 shown in FIGS. 6A and 6B.

Meanwhile, FIG. 12 illustrates that each of the sensor electrodes 221 and 231 are configured as bar-shaped electrodes, but the shape of the sensor electrodes 221 and 231 is not limited thereto.

A pressure sensitive layer 240 may be interposed between the first sensor electrode 221 and the second sensor electrode 231.

The pressure sensitive layer 240 may be entirely provided on the touch regions TA1 and TA2 or locally provided at only a position at which the first sensor electrode 221 and the second sensor electrode 231 overlap with each other.

The pressure sensitive layer 240 may have a single- or multi-layered structure.

The pressure sensitive layer 240 changes its electrical characteristics under physical deformation. In particular, the pressure sensitive layer 240 may include a material that is disposed between the first sensor electrode 221 and the second sensor electrode 231 and has a resistance that is changed depending on a pressure applied by a touch input.

To this end, the pressure sensitive layer 240 may include a material that is designated as a pressure sensitive material or a pressure sensitive resistor. The material may be selected from the materials constituting the pressure sensitive layer 240 shown in FIGS. 6A and 6B.

The first sensor electrodes 221 and the second sensor electrodes 231 may intersect each other in the touch regions TA1 and TA2 to form a plurality of intersection portions.

The first sensor electrode X2 to Xn−1, the pressure sensitive layer 240, and the second sensor electrode 231 that are provided at an intersection portion disposed in the first touch region TA1 may form a first pressure sensor FS1-4.

The first sensor electrode X1 or Xn, the pressure sensitive layer 240, and the second sensor electrode 231 that are provided at an intersection portion disposed in the second touch region TA2 may form a second pressure sensor FS2-4.

As the width L2 of first sensor electrodes X1 and Xn provided in the second touch region TA2 is larger than the width L1 of first sensor electrodes X2 to Xn−1 provided in the first touch region TA1, a current path between the electrodes of the second pressure sensor FS2-4 is larger than that between the electrodes of the first pressure sensor FS1-4.

Therefore, when the second touch region TA2 is in a flat state before being bent, the pressure detection sensitivity of the second pressure sensors FS2-4 may be larger than that of the first pressure sensors FS1-4.

One or more lines 251 may be connected to each of the first sensor electrodes 221 and the second sensor electrodes 231. Each of the lines 251 may be connected to an external driving circuit through at least one pad 252. For example, the first sensor electrodes 221 and the second sensor electrodes 231 may be connected to the above-described sensor controller TSC through the lines 251 and the pads 252.

A driving voltage may be applied to at least one of the first sensor electrodes 221 and the second sensor electrodes 231, and a sensing signal corresponding to the driving voltage may be output from the other of the first sensor electrodes 221 and the second sensor electrodes 231. The presence of a touch input, a position of the touch input, and a pressure caused by the touch input can be detected by analyzing the sensing signal.

Figure 15:
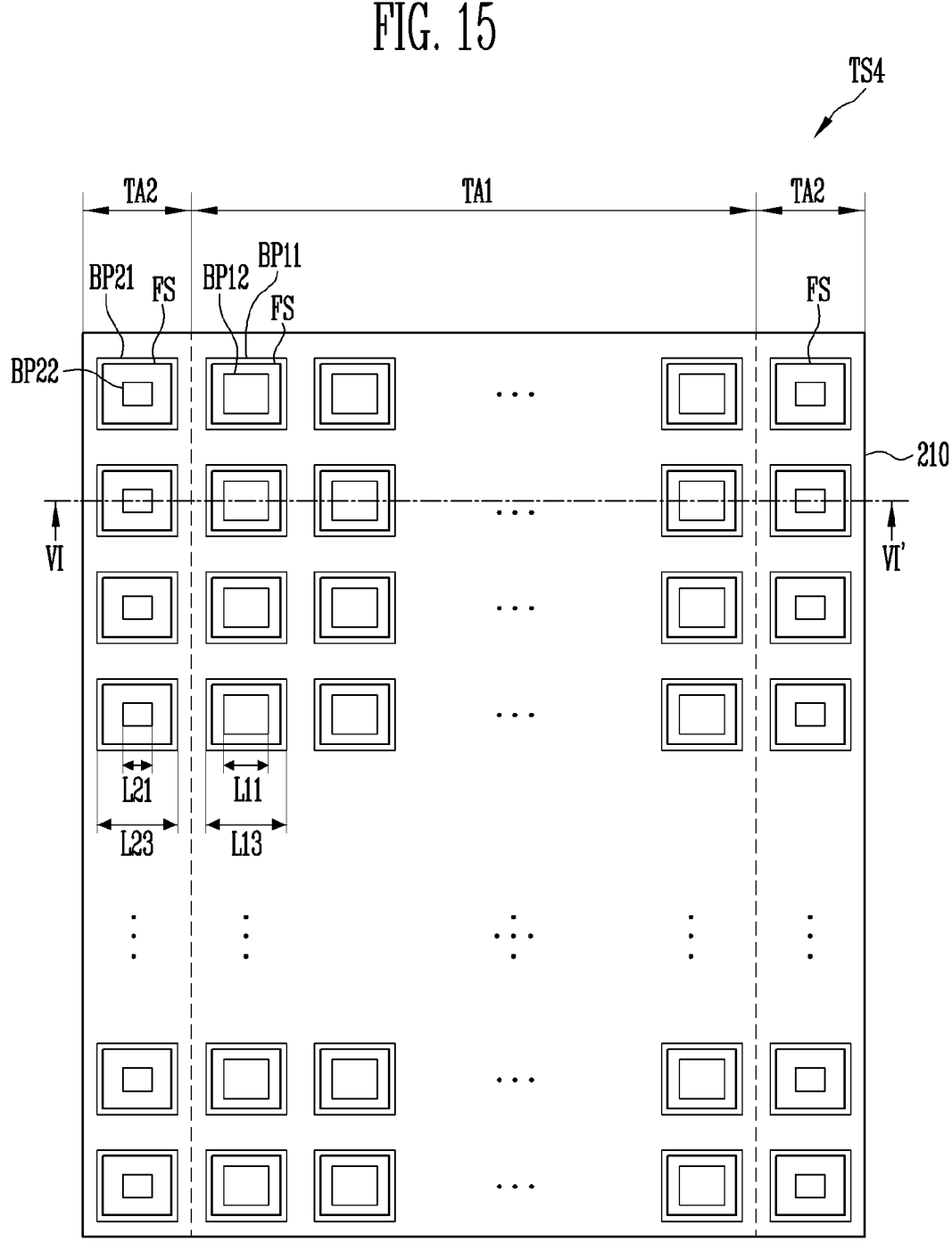
FIG. 15 is a plan view illustrating a touch sensor according to another embodiment of the present disclosure.
Figure 16:
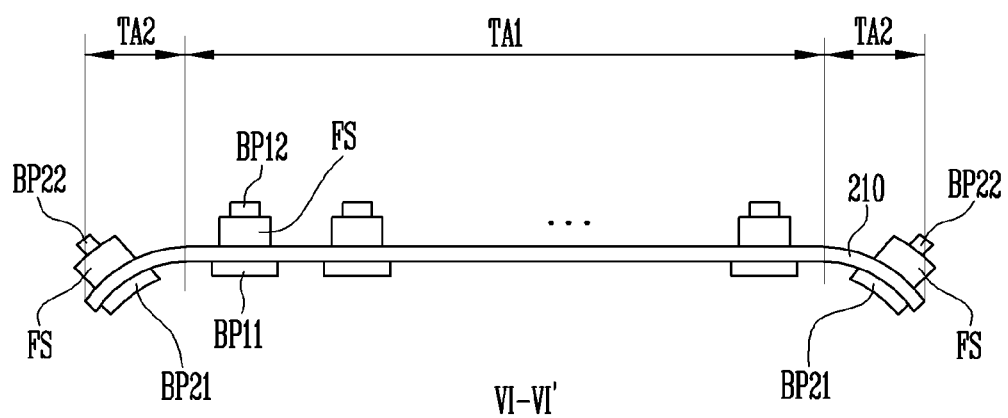
FIG. 16 is a view illustrating a section taken along line VI-VI' of FIG. 15.

FIG. 15 is a plan view illustrating a touch sensor according to another embodiment of the present disclosure. FIG. 16 is a view illustrating a section taken along line VI-VI' of FIG. 15.

In FIGS. 15 and 16, components similar or identical to those of FIGS. 1 to 14 are designated by like reference numerals, and their detailed descriptions will be omitted.

Referring to FIGS. 15 and 16, the touch sensor TS4 according to the embodiment of the present disclosure may include a first sensor substrate 210 and a plurality of pressure sensors FS that are disposed on the first sensor substrate 210.

The touch sensor TS4 may be configured to have a first touch region TA1 and at least one second touch region TA2.

The first touch region TA1 may have a flat shape, and the second touch region TA2 may have a curved shape that is bent from an edge of the first touch region TA1.

Meanwhile, FIGS. 15 and 16 illustrate a case where two second touch regions TA2 are provided at both sides of the first touch region TA1, but the present disclosure is not limited thereto. For example, the second touch region TA2 may be disposed at only any one of both the sides of the first touch region TA1. Alternatively, the second touch region TA2 may be provided at an upper or lower side of the first touch region TA1.

The pressure sensors FS may be identical to the above-described first pressure sensor FS1, FS1-1, FS1-2, or FS1-3 or the above-described second pressure sensor FS2, FS2-1, FS2-2, or FS2-3.

The touch sensor TS4 according to the embodiment of the present disclosure may include a plurality of bumps BP11, BP12, BP21, and BP22 for concentrating a pressure caused by a touch input on an effective point of each of the pressure sensors FS. The plurality of bumps BP11, BP12, BP21, and BP22 may form a bump structure.

The bumps BP11, BP12, BP21, and BP22 may be provided on at least one of a top surface and a bottom surface of the pressure sensors FS. The bump structure may include at least one of a plurality of lower bumps BP11 and BP21 that are disposed on the bottom surface of the pressure sensors FS and a plurality of upper bumps BP12 and BP22 that are disposed on the top surface of the pressure sensors FS.

The bumps BP11, BP12, BP21, and BP22 may be made of a flexible or rigid material and made of a material that has or does not have elasticity. In addition, the bumps BP11, BP12, BP21, and BP22 may be made of a conductive or non-conductive material. That is, in the present disclosure, the material or property of the bumps BP11, BP12, BP21, and BP22 is not particularly limited. Therefore, the material, thickness, etc. of the bumps BP11, BP12, BP21, and BP22 may be selected by considering mechanical characteristics corresponding to design conditions of the display device DD.

In addition, when an additional desired function is to be provided to the bumps BP11, BP12, BP21, and BP22 in addition to concentrating the pressure to the pressure sensors FS, the material, etc. of the bumps BP11, BP12, BP21, and BP22 may be selected according to a desired function.

For example, as at least some of the bumps BP11, BP12, BP21, and BP22 are made of a conductive material to serve as an electromagnetic interference (EMI) shielding layer. For example, the lower bumps BP11 and BP21 or the upper bumps BP12 and BP22 that are interposed between the touch sensor TS4 and the display panel DP may be made of a conductive pressure sensitive adhesive including a conductive material such as copper (Cu) to serve as the EMI shielding layer.

The bumps BP11, BP12, BP21, and BP22 may include the first bumps BP11 and BP12 that are disposed in the first touch region TA1 and the second bumps BP21 and BP22 that are disposed in the second touch region TA2.

The first bumps BP11 and BP12 may include the first lower bumps BP11 that are disposed on the bottom surface of the pressure sensors FS and the first upper bumps BP12 that are disposed on the top surface of the pressure sensors FS.

The first lower bumps BP11 may be distributed in dot shapes. The first lower bumps BP11 may be separated from each other in the first touch region TA1. However, the present disclosure is not limited thereto, and some of the first lower bumps BP11 may be integrally connected to each other.

The first upper bumps BP12 may be distributed in dot shapes. The first upper bumps BP12 may be separated from each other in the first touch region TA1. However, the present disclosure is not limited thereto, and some of the first upper bumps BP12 may be integrally connected to each other.

When a pressure caused by a touch input is applied, the first bumps BP11 and BP12 may effectively concentrate the pressure on a central portion of the pressure sensor FS to improve the sensitivity of the pressure sensor FS.

The second bumps BP21 and BP22 may include the second lower bumps BP21 that are disposed on the bottom surface of the pressure sensors FS and the second upper bumps BP22 that are disposed on the top surface of the pressure sensors FS.

The second lower bumps BP21 may be distributed in dot shapes. The second lower bumps BP21 may be separated from each other in the second touch region TA2. However, the present disclosure is not limited thereto, and some of the second lower bumps BP21 may be integrally connected to each other.

The size of the second lower bump BP21 may be smaller than that of the first lower bump BP11. For example, the width L23 of the second lower bump BP21 may be smaller than the width L13 of the first lower bump BP11.

Here, the term 'size' may mean an area viewed on a plane. For example, the area in which the pressure sensor FS and the second lower bump BP21 overlap with each other may be smaller than that in which the pressure sensor FS and the first lower bump BP11 overlap with each other.

As the second lower bumps BP21 have a size that is smaller than that of the first lower bumps BP11, the second lower bumps BP21 can efficiently concentrate the pressure on the pressure sensors FS as compared with the first lower bumps BP11.

Therefore, when the second touch region TA2 is in a flat state before being bent, the pressure detection sensitivity of the pressure sensors FS provided in the second touch region TA2 may be larger than that of the pressure sensors FS provided in the first touch region TA1.

The second upper bumps BP22 may be distributed in dot shapes. The second upper bumps BP22 may be separated from each other in the second touch region TA2. However, the present disclosure is not limited thereto, and some of the second upper bumps BP22 may be integrally connected to each other.

The size of the second upper bumps BP22 may be smaller than that of the first upper bumps BP12. For example, the width L21 of the second upper bump BP22 may be smaller than the width L11 of the first upper bump BP12. Alternatively, the area in which the pressure sensor FS and the second upper bump BP22 overlap with each other may be smaller than that in which the pressure sensor FS and the first upper bump BP12 overlap with each other.

As the second upper bumps BP22 have a size that is smaller than that of the first upper bumps BP12, the second upper bumps BP22 can efficiently concentrate the pressure on the pressure sensors FS as compared with the first upper bumps BP12.

Therefore, when the second touch region TA2 is in a flat state before being bent, the pressure detection sensitivity of the pressure sensors FS provided in the second touch region TA2 may be larger than that of the pressure sensors FS provided in the first touch region TA1.

Meanwhile, FIGS. 15 and 16 illustrate a case where the same pressure sensors FS are provided in the first touch region TA1 and the second touch region TA2, but the present disclosure is not limited thereto.

For example, the above-described first pressure sensors FS1, FS1-2, or FS1-3 may be provided in the first touch region TA1, and the above-described second pressure sensors FS2, FS2-1, or FS2-3 may be provided in the second touch region TA2.

In addition, FIGS. 15 and 16 illustrate that the size of the lower bump PB11 or BP21 is larger than that of the upper bump B12 or B22, but the present disclosure is not limited thereto.

Figure 17:
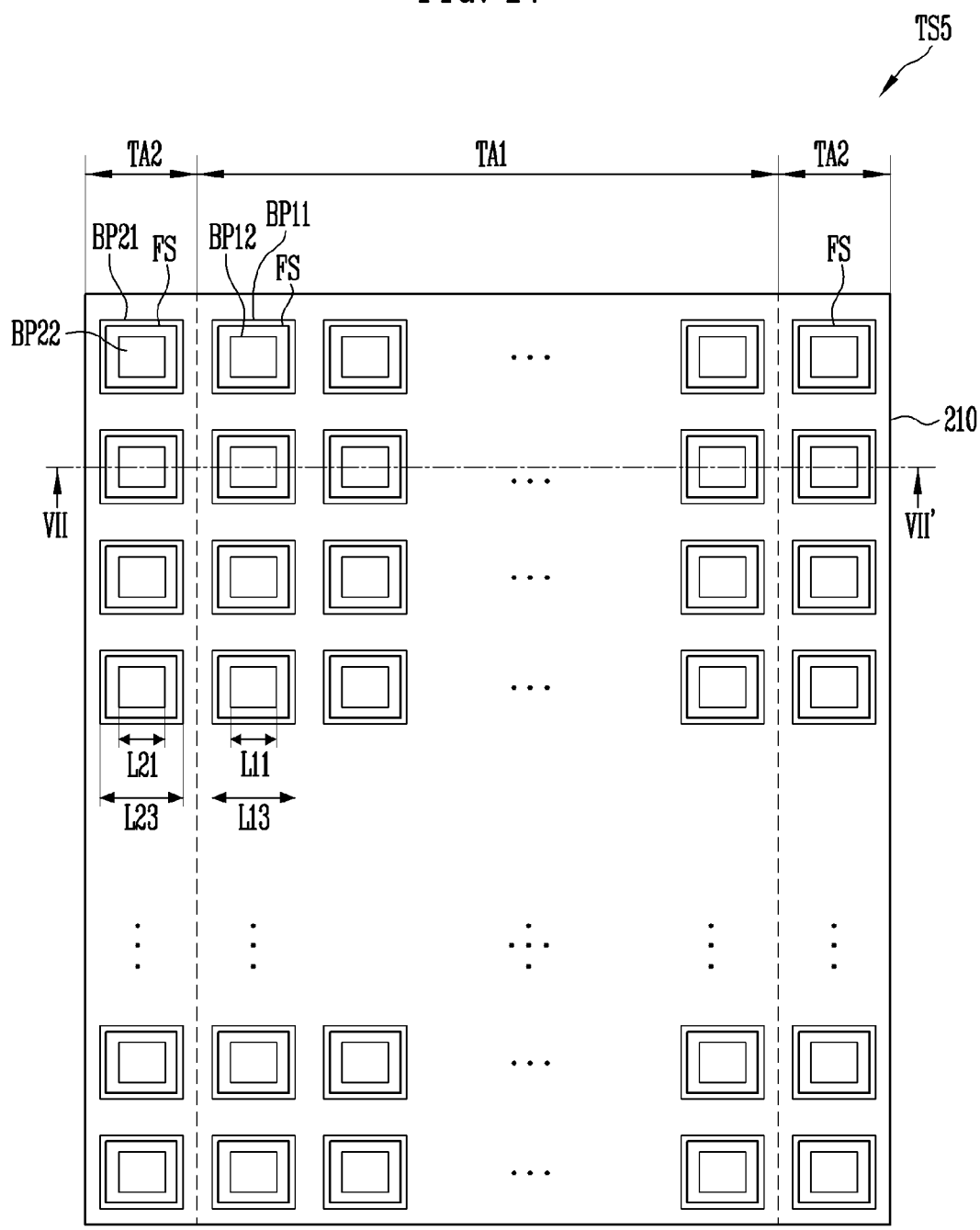
FIG. 17 is a plan view illustrating a touch sensor according to another embodiment of the present disclosure.
Figure 18:
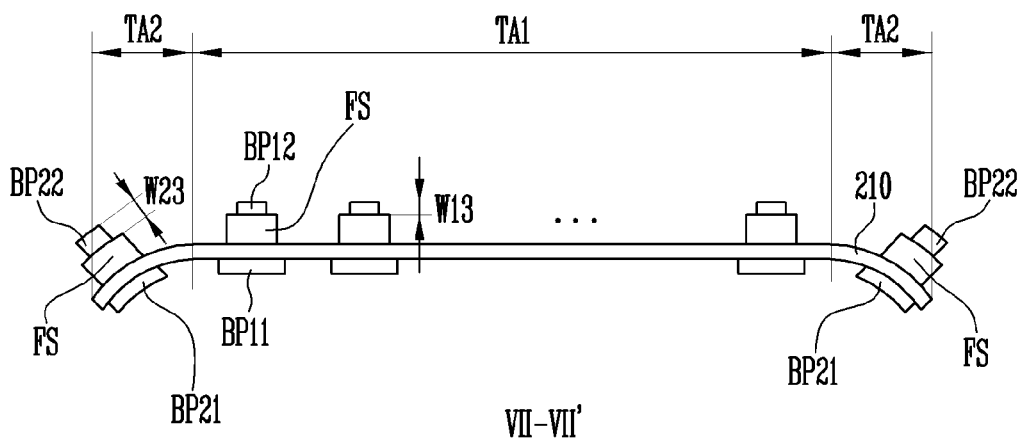
FIG. 18 is a view illustrating a section taken along line VII-VII' of FIG. 17.

FIG. 17 is a plan view illustrating a touch sensor according to another embodiment of the present disclosure. FIG. 18 is a view illustrating a section taken along line VII-VII' of FIG. 17.

In FIGS. 17 and 18, components similar or identical to those of FIGS. 1 to 16 are designated by like reference numerals, and their detailed descriptions will be omitted.

Referring to FIGS. 17 and 18, the touch sensor TS5 according to the embodiment of the present disclosure may include a first sensor substrate 210 and a plurality of pressure sensors FS that are disposed on the first sensor substrate 210.

The touch sensor TS5 may be configured to have a first touch region TA1 and at least one second touch region TA2.

The first touch region TA1 may have a flat shape, and the second touch region TA2 may have a curved shape that is bent from an edge of the first touch region TA1.

The pressure sensors FS may be identical to the above-described first pressure sensor FS1, FS1-1, FS1-2, or FS1-3 or the above-described second pressure sensor FS2, FS2-1, FS2-2, or FS2-3.

The touch sensor TS5 according to the embodiment of the present disclosure may include a plurality of bumps BP11, BP12, BP21, and BP22 for concentrating a pressure caused by a touch input on an effective point of each of the pressure sensors FS. The plurality of bumps BP11, BP12, BP21, and BP22 may form a bump structure.

The bumps BP11, BP12, BP21, and BP22 may be provided on at least one of a top surface and a bottom surface of the pressure sensors FS. The bump structure may include at least one of a plurality of lower bumps BP11 and BP21 that are disposed on the bottom surface of the pressure sensors FS and a plurality of upper bumps BP12 and BP22 that are disposed on the top surface of the pressure sensors FS.

The bumps BP11, BP12, BP21, and BP22 may include the first bumps BP11 and BP12 that are disposed in the first touch region TA1 and the second bumps BP21 and BP22 that are disposed in the second touch region TA2.

The first bumps BP11 and BP12 may include the first lower bumps BP11 that are disposed on the bottom surface of the pressure sensors FS and first upper bumps BP12 that are disposed on the top surface of the pressure sensors FS.

The first lower bumps BP11 may be distributed in dot shapes. The first lower bumps BP11 may be separated from each other in the first touch region TA1. However, the present disclosure is not limited thereto, and some of the first lower bumps BP11 may be integrally connected to each other.

The first upper bumps BP12 may be distributed in dot shapes. The first upper bumps BP12 may be separated from each other in the first touch region TA1. However, the present disclosure is not limited thereto, and some of the first upper bumps BP12 may be integrally connected to each other.

When a pressure caused by a touch input is applied, the first bumps BP11 and BP12 may effectively concentrate the pressure on a central portion of the pressure sensor FS to improve the sensitivity of the pressure sensor FS.

The second bumps BP21 and BP22 may include the second lower bumps BP21 that are disposed on the bottom surface of the pressure sensors FS and the second upper bumps BP22 that are disposed on the top surface of the pressure sensors FS.

The second lower bumps BP21 may be distributed in dot shapes. The second lower bumps BP21 may be separated from each other in the second touch region TA2. However, the present disclosure is not limited thereto, and some of the second lower bumps BP21 may be integrally connected to each other.

The size of the second lower bump BP21 may be almost equal to that of the first lower bump BP11. For example, the width L23 of the second lower bump BP21 may be almost equal to the width L13 of the first lower bump BP11.

The second upper bumps BP22 may be distributed in dot shapes. The second upper bumps BP22 may be separated from each other in the second touch region TA2. However, the present disclosure is not limited thereto, and some of the second upper bumps BP22 may be integrally connected to each other.

In addition, the size of the second upper bump BP22 may be almost equal to that of the first upper bump BP12. For example, the width L21 of the second upper bump BP22 may be almost equal to the width L11 of the first upper bump BP12. However, the present disclosure is not limited thereto, and the size of the second upper bump BP22 may be smaller than that of the first upper bump BP12.

The height W23 of the second upper bump BP22 may be larger than the height W13 of the first upper bump BP12.

As the height W23 of the second upper bump BP22 may be larger than the height W13 of the first upper bump BP12, the second upper bump BP22 can efficiently concentrate the pressure on the pressure sensor FS as compared with the first upper bump BP12.

Therefore, when the second touch region TA2 is in a flat state before being bent, the pressure detection sensitivity of the pressure sensors FS that are provided in the second touch region TA2 may be larger than that of the pressure sensors FS that are provided in the first touch region TA1.

Meanwhile, FIGS. 17 and 18 illustrate a case where the same pressure sensors FS are provided in the first touch region TA1 and the second touch region TA2, but the present disclosure is not limited thereto.

For example, the above-described first pressure sensors FS1, FS1-2, or FS1-3 may be provided in the first touch region TA1, and the above-described second pressure sensors FS2, FS2-1, or FS2-3 may be provided in the second touch region TA2.

In addition, FIG. 18 illustrates that the height of the second lower bump BP21 and the height of the first lower bump BP11 are almost equal to each other. However, the present disclosure is not limited thereto, and the height of the second lower bump BP21 may be larger than that of the first lower bump BP11.

FIGS. 17 and 18 illustrate that the size of the lower bump BP11 or BP21 is larger than that of the upper bump BP12 or BP22, but the present disclosure is not limited thereto.

FIGS. 15 to 18 illustrate that the size of the second bumps BP21 or BP22 is smaller than that of the first bumps BP11 or BP12 or that the height of the second bumps BP21 or BP22 is larger than that of the first bumps BP11 or BP12, but the present disclosure is not limited thereto. For example, the size and height of the second bumps BP21 or BP22 may be larger than those of the first bumps BP11 or BP12.

Figure 19:
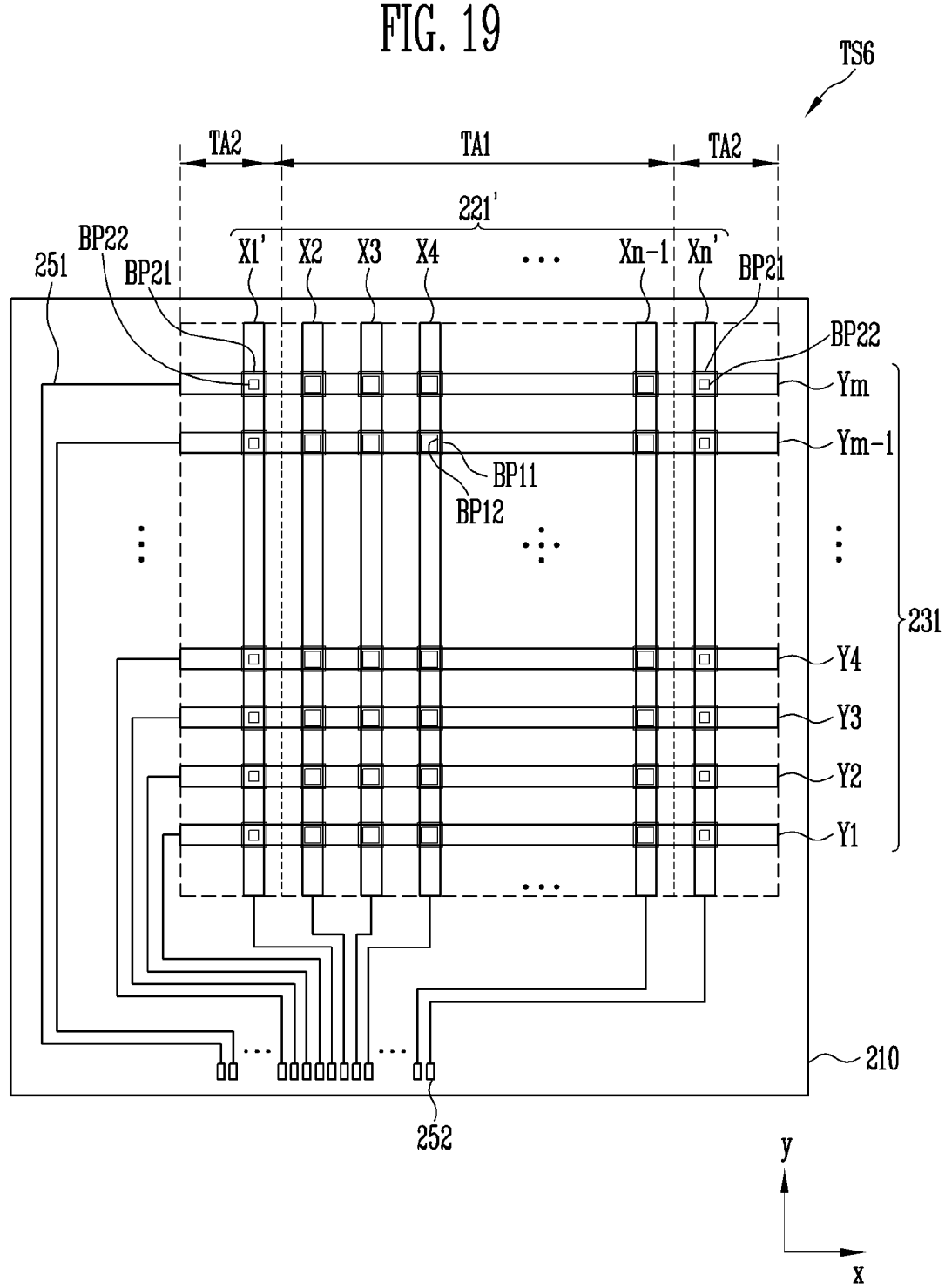
FIG. 19 is a plan view illustrating a touch sensor according to another embodiment of the present disclosure.
Figure 20:
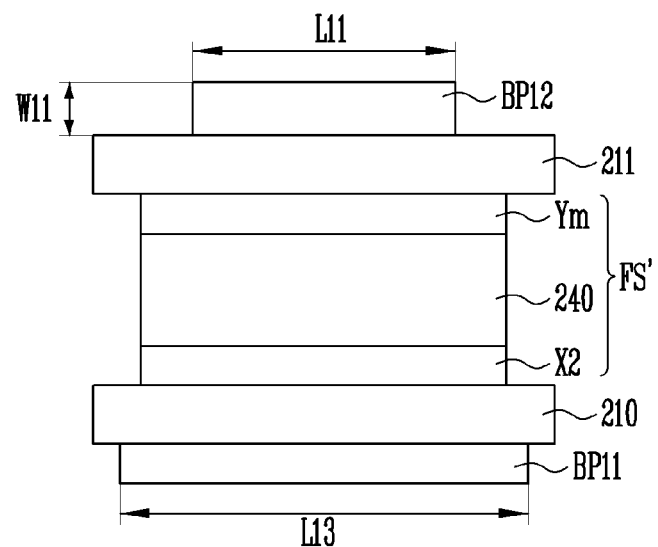
FIGS. 20 and 21 are views illustrating sections of intersection portions shown in FIG. 19.
Figure 21:
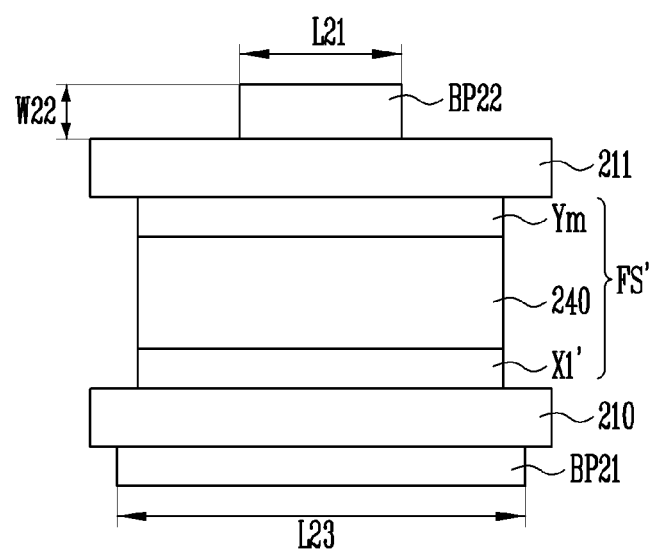

FIG. 19 is a plan view illustrating a touch sensor according to another embodiment of the present disclosure. FIGS. 20 and 21 are views illustrating sections of intersection portions shown in FIG. 19.

In FIGS. 19 to 21, components similar or identical to those of FIGS. 1 to 18 are designated by like reference numerals, and their detailed descriptions will be omitted.

Referring to FIGS. 19 to 21, the touch sensor TS6 according to the embodiment of the present disclosure may include a first sensor electrode 210, a plurality of sensor electrodes 221' and 231 that are disposed on the first sensor substrate 210, and a second sensor substrate 211 that is disposed on the sensor electrodes 221' and 231. The sensor electrodes 221' and 231 may be provided in the touch regions TA1 and TA2.

The sensor substrate 210 or 211 may be made of an insulative material such as glass or resin, and have a single- or multi-layered structure. In addition, the sensor substrate 210 or 211 may be a flexible substrate or a rigid substrate.

The sensor substrate 210 or 211 may be made of at least one of the above-described materials listed as the material constituting the display substrate 110. In addition, the sensor substrate 210 or 211 may be made of the same material as the display substrate 110 or made of a material that is different from that of the display substrate 110.

The touch sensor TS6 may be configured to have a first touch region TA1 and at least one second touch region TA2.

The first touch region TA1 may have a flat shape, and the second touch region TA2 may have a curved shape that is bent from an edge of the first touch region TA1.

The sensor electrodes 221' and 231 may include a plurality of first sensor electrodes 221' and a plurality of second sensor electrodes 231 that extend in different directions.

The first sensor electrodes 221' may be disposed on the first sensor substrate 210 and arranged along a first direction (e.g., an X-axis direction).

The shapes of the first sensor electrodes 221' may be almost equal to each other.

The second sensor electrodes 231 may be spaced apart from the first sensor electrodes 221' and disposed on the first sensor electrodes 221'. The second sensor electrodes 231 may be arranged along a second direction (e.g., a Y-axis direction).

Each of the first sensor electrodes 221' and the second sensor electrodes 231 may include a conductive material. In addition, each of the first sensor electrodes 221' and the second sensor electrodes 231 may have a single- or multi-layered structure. Further, the first sensor electrodes 221' may be made of the same material as the second sensor electrodes 231 or made of a material that is different from that of the second sensor electrodes 231. In addition, the first sensor electrodes 221' and the second sensor electrodes 231 may be plate-shaped electrodes or mesh-shaped electrodes. The conductive material may be selected from the materials constituting the first electrode 220 shown in FIGS. 6A and 6B.

Meanwhile, FIG. 19 illustrates that each of the sensor electrodes 221' and 231 are configured as bar-shaped electrodes, but the shape of the sensor electrodes 221' and 231 is not limited thereto.

A pressure sensitive layer 240 may be interposed between the first sensor electrode 221' and the second sensor electrode 231.

The pressure sensitive layer 240 may be entirely provided on the touch regions TA1 and TA2 or locally provided at only a position at which the first sensor electrode 221' and the second sensor electrode 231 overlap with each other.

The pressure sensitive layer 240 may have a single- or multi-layered structure.

The pressure sensitive layer 240 changes its electrical characteristics under physical deformation. In particular, the pressure sensitive layer 240 may include a material that is disposed between the first sensor electrode 221' and the second sensor electrode 231 and has a resistance that is changed depending on a pressure applied by a touch input.

To this end, the pressure sensitive layer 240 may include a material that is designated as a pressure sensitive material or a pressure sensitive resistor. The material may be selected from the materials constituting the pressure sensitive layer 240 shown in FIGS. 6A and 6B.

The first sensor electrodes 221' and the second sensor electrodes 231 may intersect each other in the touch regions TA1 and TA2 to form a plurality of intersection portions.

The first sensor electrode X2 to Xn−1, the pressure sensitive layer 240, and the second sensor electrode 231 that are provided at an intersection portion disposed in the first touch region TA1 may form a pressure sensor FS'.

The first sensor electrode X1' or Xn', the pressure sensitive layer 240, and the second sensor electrode 231 that are provided at an intersection portion disposed in the second touch region TA2 may form a pressure sensor FS'.

The touch sensor TS6 according to the embodiment of the present disclosure may include a plurality of bumps BP11, BP12, BP21, and BP22 for concentrating a pressure caused by a touch input on an effective point of each of the pressure sensors FS'. The plurality of bumps BP11, BP12, BP21, and BP22 may form a bump structure.

The bumps BP11, BP12, BP21, and BP22 may be provided on at least one of a top surface and a bottom surface of the pressure sensors FS'. The bump structure may include at least one of a plurality of lower bumps BP11 and BP21 that are disposed on the bottom surface of the pressure sensors FS' and a plurality of upper bumps BP12 and BP22 that are disposed on the top surface of the pressure sensors FS'.

The bumps BP11, BP12, BP21, and BP22 may be provided at positions corresponding to the intersection portions of the first sensor electrodes 221' and the second sensor electrodes 231.

The bumps BP11, BP12, BP21, and BP22 may include the first bumps BP11 and BP12 that are provided in the first touch region TA1 and the second bumps BP21 and BP22 that are provided in the second touch region TA2.

The first bumps BP11 and BP12 may include the first lower bumps BP11 that are disposed on the bottom surface of the first sensor electrodes 221' and the first upper bumps BP12 that are disposed on the top surface of the second sensor electrodes 231.

The first lower bumps BP11 may be distributed in dot shapes. The first lower bumps BP11 may be separated from each other in the first touch region TA1. However, the present disclosure is not limited thereto, and some of the first lower bumps BP11 may be integrally connected to each other.

The first upper bumps BP12 may be distributed in dot shapes. The first upper bumps BP12 may be separated from each other in the first touch region TA1. However, the present disclosure is not limited thereto, and some of the first upper bumps BP12 may be integrally connected to each other.

The second bumps BP21 and BP22 may include the second lower bumps BP21 that are disposed on the bottom surface of the first sensor electrodes 221' and the second upper bumps BP22 that are disposed on the top surface of the second sensor electrodes 231.

The second lower bumps BP21 may be distributed in dot shapes. The second lower bumps BP21 may be separated from each other in the second touch region TA2. However, the present disclosure is not limited thereto, and some of the second lower bumps BP21 may be integrally connected to each other.

The size of the second lower bump BP21 may be smaller than that of the first lower bump BP11. For example, the width L23 of the second lower bump BP21 may be smaller than the width L13 of the first lower bump BP11.

As the second lower bumps BP21 have a size smaller than that of the first lower bumps BP11, the second lower bumps BP21 can efficiently concentrate the pressure on the pressure sensors FS' as compared with the first lower bumps BP11. Therefore, when the second touch region TA2 is in a flat state before being bent, the pressure detection sensitivity of the pressure sensors FS' provided in the second touch region TA2 may be larger than that of the pressure sensors FS' provided in the first touch region TA1.

The second upper bumps BP22 may be distributed in dot shapes. The second upper bumps BP22 may be separated from each other in the second touch region TA2. However, the present disclosure is not limited thereto, and some of the second upper bumps BP22 may be integrally connected to each other.

The size of the second upper bumps BP22 may be smaller than that of the first upper bumps BP12. For example, the width L21 of the second upper bump BP22 may be smaller than the width L11 of the first upper bump BP12.

As the second upper bumps BP22 have a size that is smaller than that of the first upper bumps BP12, the second upper bumps BP22 can efficiently concentrate the pressure on the pressure sensors FS as compared with the first upper bumps BP12. Therefore, when the second touch region TA2 is in a flat state before being bent, the pressure detection sensitivity of the pressure sensors FS' provided in the second touch region TA2 may be larger than that of the pressure sensors FS' provided in the first touch region TA1.

Figure 22:
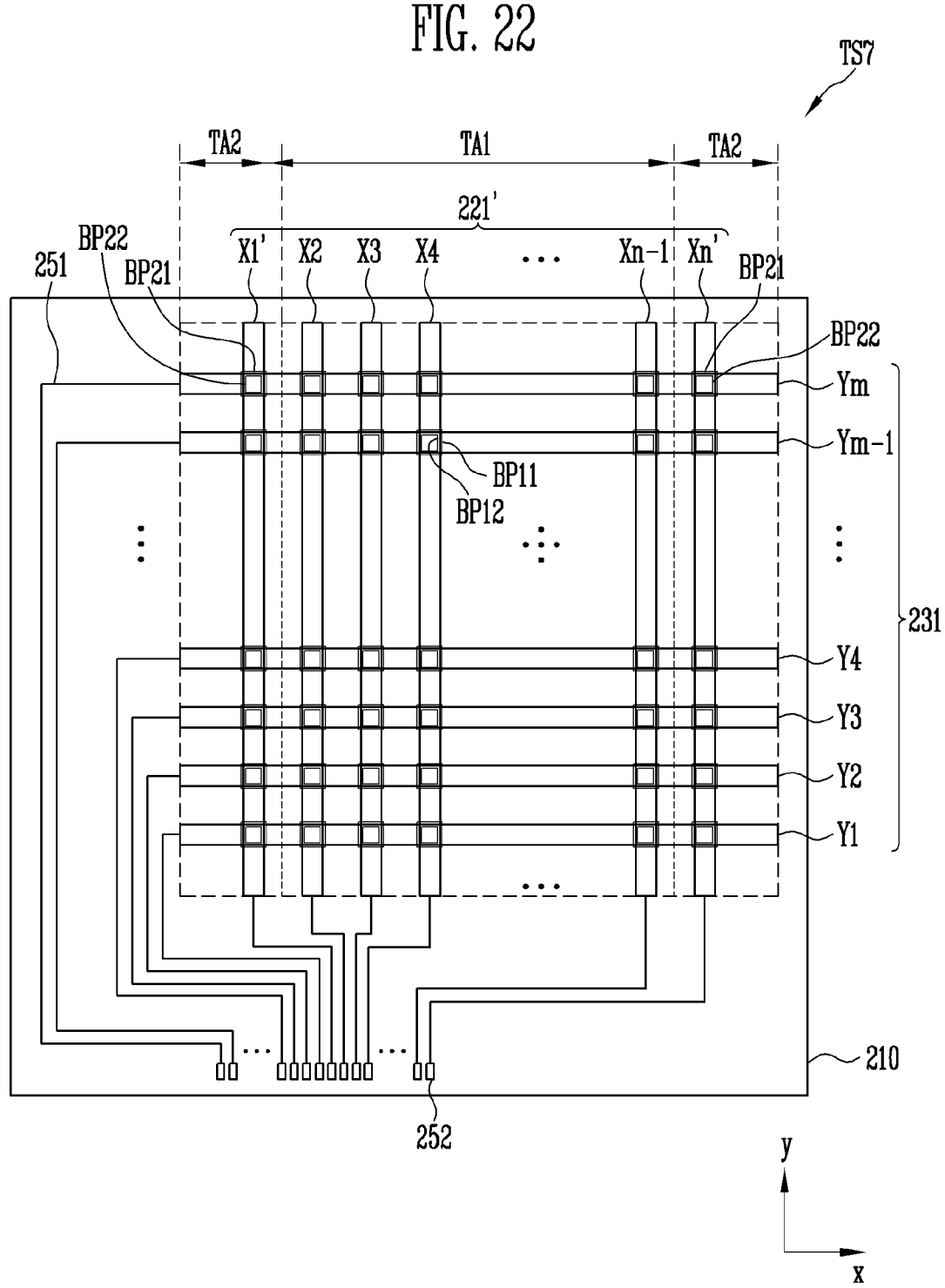
FIG. 22 is a plan view illustrating a touch sensor according to another embodiment of the present disclosure.
Figure 23:
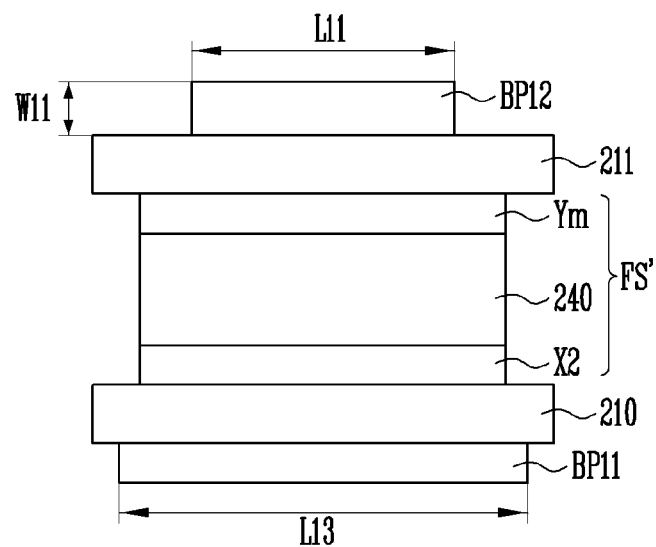
FIGS. 23 and 24 are views illustrating sections of intersection portions shown in FIG. 22.
Figure 24:
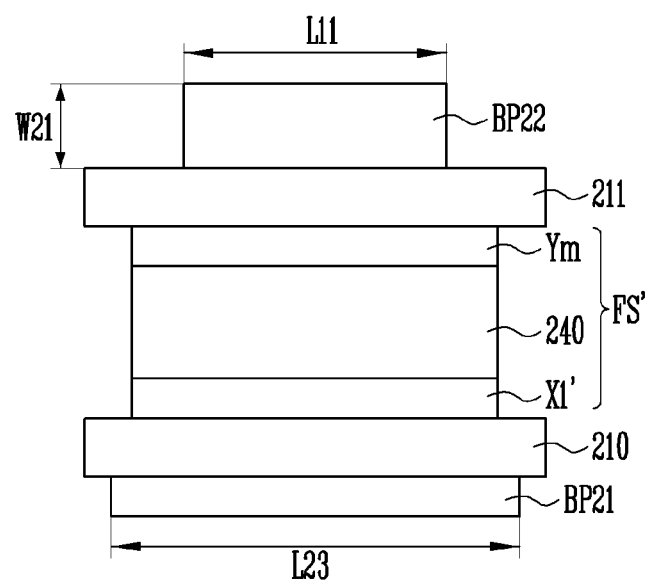

FIG. 22 is a plan view illustrating a touch sensor according to another embodiment of the present disclosure. FIGS. 23 and 24 are views illustrating sections of intersection portions shown in FIG. 22.

In the description of the touch sensor TS7 shown in FIGS. 22 to 24, descriptions of components identical to those of the touch sensor TS6 shown in FIGS. 19 to 21 will be omitted, and only differences will be described.

The size of the second lower bump BP21 may be almost equal to that of the first lower bump BP11. For example, the width L23 of the second lower bump BP21 may be almost equal to the width L13 of the first lower bump BP11.

In addition, the size of the second upper bump BP22 may be almost equal to that of the first upper bump BP12. For example, the width L21 of the second upper bump BP22 may be almost equal to the width L11 of the first upper bump BP12.

The height W23 of the second upper bump BP22 may be larger than the height W13 of the first upper bump BP12.

As the height W23 of the second upper bump BP22 is larger than the height W13 of the first upper bump BP12, the second upper bumps BP22 can efficiently concentrate the pressure on the pressure sensors FS' as compared with the first upper bumps BP12. Therefore, when the second touch region TA2 is in a flat state before being bent, the pressure detection sensitivity of the pressure sensors FS' provided in the second touch region TA2 may be larger than that of the pressure sensors FS' provided in the first touch region TA1.

Meanwhile, FIGS. 19 to 24 illustrate that the same first sensor electrodes 221' are provided in the first touch region TA1 and the second touch region TA2, but the present disclosure is not limited thereto.

For example, the above-described first sensor electrodes X2 to Xn−1 may be provided in the first touch region TA1, and the above-described first sensor electrodes X1' and Xn' may be provided in the second touch region TA2.

In addition, FIGS. 19 to 24 illustrate that the size of the second bumps BP21 or BP22 is smaller than that of the first bumps BP11 or BP12 or that the height of the second bumps BP21 or BP22 is smaller than that of the first bumps BP11 or BP12, but the present disclosure is not limited thereto. For example, the size and height of the second bumps BP21 or BP22 may be larger than those of the first bumps BP11 or BP12.

Figure 25:
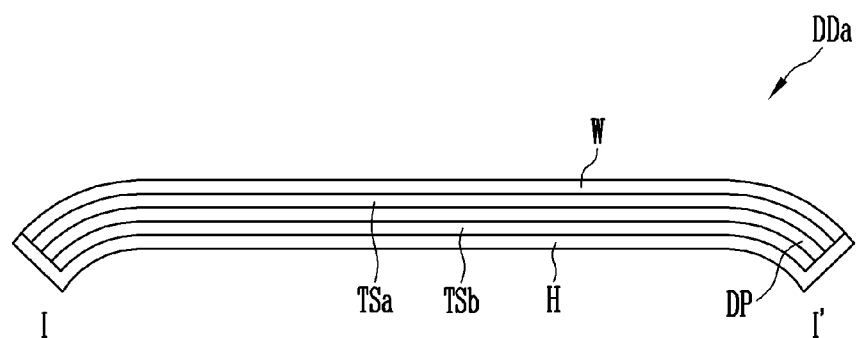
FIG. 25 is a view illustrating another embodiment of the section taken along line I-I' of FIG. 1.

FIG. 25 is a view illustrating another embodiment of the section taken along line I-I' of FIG. 1.

Referring to FIG. 25, the display device DDa according to the embodiment of the present disclosure may include a first touch sensor TSa, a second touch sensor TSb, a display panel DP, a window W, and a housing H.

The first touch sensor TSa may be disposed on the display panel DP and sense a position of a touch input to the display device DDa. The first touch sensor TSa may include touch electrodes for sensing a position of a touch, and the touch electrodes may sense the position of the touch by using a variation in capacitance that is reflected to a sensing signal output from the touch electrodes.

The second touch sensor TSb may be disposed on the bottom surface of the display panel DP and include pressure sensors to sense a position of a touch input to the display device DDa and a pressure caused by the touch input. In this case, the second touch sensor TSb may be any one of the touch sensors TS and TS1 to TS7 described with reference to FIGS. 1 to 24. That is, the display device DDa according to the embodiment of the present disclosure may separately include a first sensor for sensing a position of a touch input and a second sensor for sensing a pressure.

Meanwhile, FIG. 25 illustrates that the second touch sensor TSb, the display panel DP, and the first touch sensor TSa are sequentially stacked. However, the present disclosure is not limited thereto, and the stacking order of the second touch sensor TSb, the display panel DP, and the first touch sensor TSa may be variously changed.

Figure 26A:
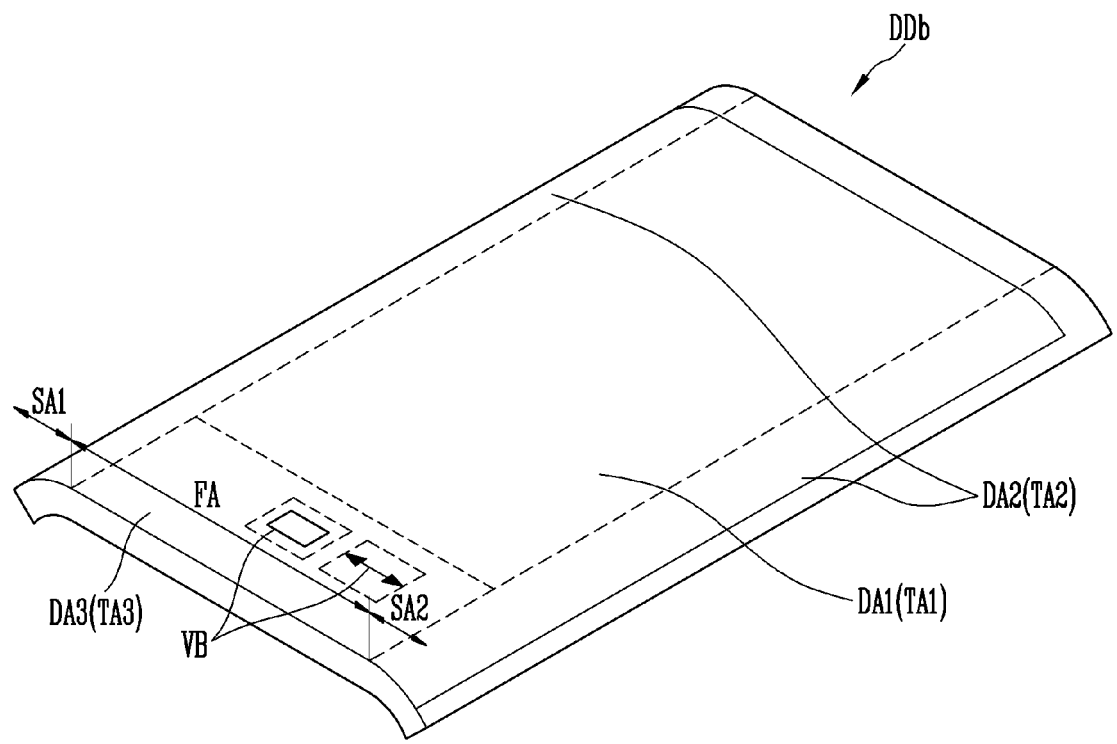
FIG. 26A is a view illustrating a display device according to another embodiment of the present disclosure.
Figure 26B:
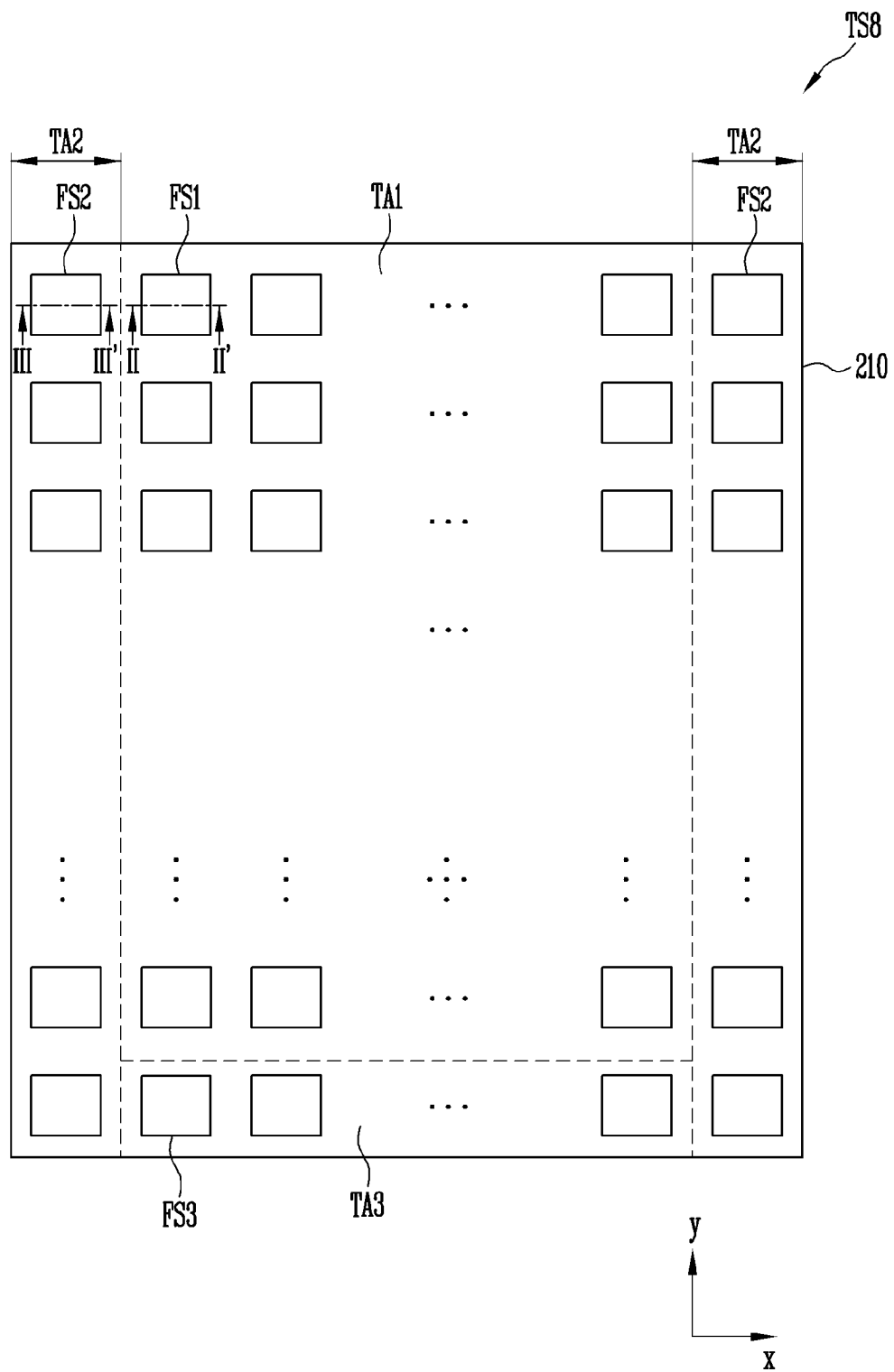
FIG. 26B is a view illustrating a touch sensor included in the display device shown in FIG. 26A.

FIG. 26A is a view illustrating a display device according to another embodiment of the present disclosure. FIG. 26B is a view illustrating a touch sensor included in the display device shown in FIG. 26A.

In the description of the display device and the touch sensor that are shown in FIGS. 26A and 26B, descriptions of components identical to those of the touch sensors shown in FIGS. 1 to 24 will be omitted, and only differences from the touch sensors shown in FIGS. 1 to 24 will be mainly described.

Referring to FIG. 26A, the display device DDb according to the embodiment of the present disclosure may include a flat region FA having a flat shape and curved regions SA1 and SA2 that are bent from edges of the flat region FA.

The curved regions SA1 and SA2 may be formed to have a predetermined curvature, and the center of curvature of the curved regions SA1 and SA2 may be located on a rear surface (e.g., a surface that is opposite to a surface on which an image is displayed) of the display device DDb.

The flat region FA may include a first display region DA1 and a third display region DA3. In addition, the flat region FA may include a first touch region TA1 that corresponds to the first display region DA1 and a third touch region TA3 that corresponds to the third display region DA3.

The curved regions SA1 and SA2 may include second display regions DA2 and second touch regions TA2 that correspond to the second display regions DA2.

The first display region DA1 may correspond to a portion at which a main image is displayed on a front surface in a touch-enabled display device, for example, a smart phone. In addition, the third display region DA3 may be a portion at which virtual buttons VB are displayed. In addition, the second display region DA2 may correspond to a portion at which a main image or sub-image is displayed on a side surface.

A touch sensor TS8 may sense a position of a touch input that is applied to the touch regions TA1, TA2, and TA3 and a pressure caused by the touch input.

The touch regions TA1, TA2, and TA3 may include the first and third touch regions TA1 and TA3 that have a flat shape, and at least one second touch region TA2 that is bent from an edge of the first touch region TA1 and the third touch region TA3 to have a curved shape.

The touch sensor TS8 may include the first pressure sensors FS1 that are provided in the first touch region TA1, the second pressure sensors FS2 that are provided in the second touch region TA2, and third pressure sensors FS3 that are provided in the third touch region TA3.

As described with reference to FIGS. 1 to 24, when the second touch region TA2 is in a flat state before being bent, the pressure detection sensitivity of the second pressure sensors FS2 may be larger than that of the first pressure sensors FS1.

The third touch region TA3 may be provided at one side of the first touch region TA1 and have a flat shape. In addition, the third touch region TA3 may be provided at one side of the second touch region TA2.

The third touch region TA3 may have an area that is smaller than that of the first touch region TA1. In particular, the third pressure sensors FS3 that corresponds to the virtual buttons VB may be provided in the third touch region TA3.

The pressure detection sensitivity of the third pressure sensors FS3 may be smaller than those of the first pressure sensors FS1 and the second pressure sensors FS2 such that an operation corresponding to a virtual button VB can be performed only when the virtual button VB is pressed with a strength comparable to a strength to press a physical button.

In this case, the pressure detection sensitivities between the first, second, and third pressure sensors FS1, FS2, and FS3 may be differentiated according to any one of the embodiments described with reference to FIGS. 1 to 24.

Figure 27:
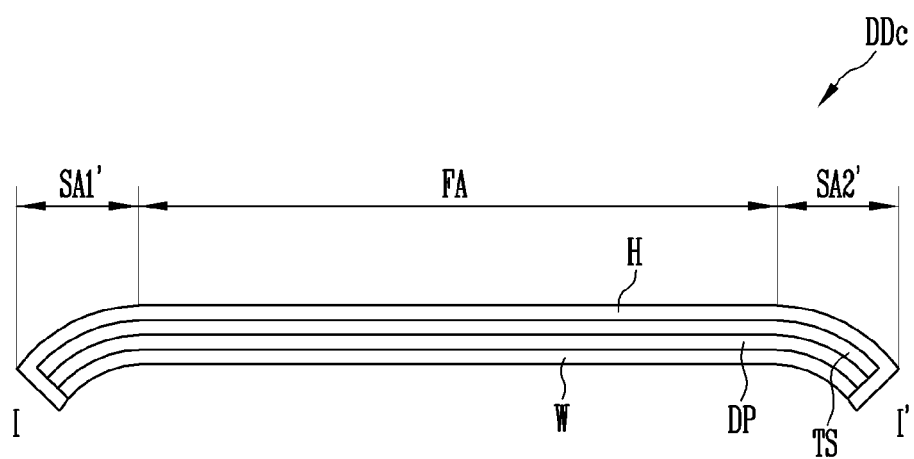
FIG. 27 is a view illustrating a display device according to another embodiment of the present disclosure.

FIG. 27 is a view illustrating a display device according to another embodiment of the present disclosure.

In the description of the display device shown in FIG. 27, descriptions of components identical to those of the touch sensors shown in FIGS. 1 to 26 will be omitted, and only differences from the display device and the touch sensors, shown in FIGS. 1 to 26, will be mainly described.

The display device DDc according to the embodiment of the present disclosure may include a flat region FA that has a flat shape and curved regions SA1' and SA2' that are bent from edges of the flat region FA.

The curved regions SA1' and SA2' may be formed to have a predetermined curvature, and the center of curvature of the curved regions SA1' and SA2' may be located on a front surface (e.g., a surface on which an image is displayed) of the display device DDc.

That is, the curved regions SA1' and SA2' may be bent in a direction that is opposite to the direction in which the curved regions SA1 and SA2 of the display device DD shown in FIG. 1 are bent.

The display device DDc according to the embodiment of the present disclosure may include a touch sensor TS including a plurality of pressure sensors. In this case, when the curved regions SA1' and SA2' are in a flat state when being bent, the pressure detection sensitivity of second pressure sensors may be smaller than that of the first pressure sensors.

The pressure detection sensitivities of the pressure sensors disposed in the curved regions SA1' and SA2' and the pressure sensors disposed in the flat region FA may be differentiated according to any one of the embodiments described with reference to FIGS. 1 to 26.

According to the present disclosure, it is possible to provide a touch sensor capable of sensing a touch pressure with high sensitivity and a display device including the touch sensor.

According to the present disclosure, it is possible to provide a touch sensor having improved pressure detection sensitivity at an edge portion having a curved shape and a display device including the touch sensor.

Example embodiments of the present disclosure have been disclosed herein. Although specific terms are employed, they are used and are to be interpreted in a generic and descriptive sense only and not for purpose of limitation. In some instances, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A touch sensor comprising:
   first pressure sensors disposed in a first touch region; and
   second pressure sensors disposed in a second touch region,
   wherein each of the first pressure sensors and the second pressure sensors includes:
   a first electrode;
   a second electrode disposed to be spaced apart from the first electrode; and
   a pressure sensitive layer disposed between the first electrode and the second electrode,
   wherein the second touch region is disposed at least one side of the first touch region and has a curved shape,
   wherein a first pressure detection sensitivity of the first pressure sensors in response to a touch input that is applied in a direction perpendicular to the first touch region is different from a second pressure detection sensitivity of the second pressure sensors in response to a touch input that is applied in a normal direction of the second touch region.

2. The touch sensor of claim 1, wherein the first touch region has a flat shape.

3. The touch sensor of claim 1, wherein the second touch region is disposed at both sides of the first touch region.

4. The touch sensor of claim 1, wherein the first electrode, the second electrode, and the pressure sensitive layer are disposed on the same plane, and
   a first thickness of the pressure sensitive layer of the first pressure sensor is smaller than a second thickness of the pressure sensitive layer of the second pressure sensor.

5. The touch sensor of claim 1, wherein the first electrode, the second electrode, and the pressure sensitive layer are disposed on the same plane, and
   a first distance between the first and second electrodes of the first pressure sensor is longer than a second distance between the first and second electrodes of the second pressure sensor.

6. The touch sensor of claim 1, wherein the second electrode is disposed on the first electrode, and
   a first thickness of the pressure sensitive layer of the first pressure sensor is larger than a second thickness of the pressure sensitive layer of the second pressure sensor.

7. The touch sensor of claim 1, wherein the second electrode is disposed on the first electrode, and
   a first overlapping area of the first and second electrodes of the first pressure sensor is smaller than a second overlapping area of the first and second electrodes of the second pressure sensor.

8. The touch sensor of claim 1, wherein each of the first pressure sensors includes a first resistance sensing line of which at least a portion is bent, and
   each of the second pressure sensors includes a second resistance sensing line of which at least a portion is bent.

9. The touch sensor of claim 8, wherein a first thickness of the first resistance sensing line is smaller than a second thickness of the second resistance sensing line.

10. The touch sensor of claim 1, further comprising:
    a first bumper disposed on at least one of upper and lower surfaces of each of the first pressure sensors; and
    a second bumper disposed on at least one of upper and lower surfaces of each of the second pressure sensors.

11. The touch sensor of claim 10, wherein a first overlapping area of the first pressure sensor and the first bump is larger than a second overlapping area of the second pressure sensor and the second bumper.

12. The touch sensor of claim 10, wherein a first height of the first bumper is smaller than a second height of the second bumper.

13. The touch sensor of claim 1, further comprising third pressure sensors disposed in a third touch region,
wherein the third touch region is disposed at one side of the first touch region and one side of the second touch region, and
a third pressure detection sensitivity of the third pressure sensors is smaller than the first pressure detection sensitivity of the first pressure sensors.

14. A display device comprising:
a display panel including a plurality of pixels disposed in a first display region and a second display region, the display panel displaying an image; and
a touch sensor disposed on at least one of upper and lower surfaces of the display panel, the touch sensor including first pressure sensors disposed in a first touch region and second pressure sensors disposed in a second touch region,
wherein each of the first pressure sensors and the second pressure sensors includes:
a first electrode;
a second electrode disposed to be spaced apart from the first electrode; and
a pressure sensitive layer disposed between the first electrode and the second electrode,
wherein the second display region and the second touch region have a curved shape,
wherein a first structure of the first pressure sensors is different from a second structure of the second pressure sensors.

15. The display device of claim 14, wherein a center of curvature of the curved shape is located on a rear surface that is opposite to a front surface on which the image is displayed, and a second pressure detection sensitivity of the second pressure sensor in response to a touch input that is applied in a normal direction of the second touch region is greater than a first pressure detection sensitivity of the first pressure sensor in response to a touch input that is applied in a direction perpendicular to the first touch region.

16. The display device of claim 14, wherein the first electrode, the second electrode, and the pressure sensitive layer are disposed on the same plane, and
a first thickness of the pressure sensitive layer of the first pressure sensor is smaller than a second thickness of the pressure sensitive layer of the second pressure sensor.

17. The display device of claim 14, wherein the first electrode, the second electrode, and the pressure sensitive layer are disposed on the same plane, and
a first distance between the first and second electrodes of the first pressure sensor is longer than a second distance between the first and second electrodes of the second pressure sensor.

18. The display device of claim 14, wherein the second electrode is disposed on the first electrode, and
a first thickness of the pressure sensitive layer of the first pressure sensor is larger than a second thickness of the pressure sensitive layer of the second pressure sensor.

19. The display device of claim 14, wherein the second electrode is disposed on the first electrode, and a first overlapping area of the first and second electrodes of the first pressure sensor is smaller than a second overlapping area of the first and second electrodes of the second pressure sensor.

20. The display device of claim 14, wherein each of the first pressure sensors includes a first resistance sensing line of which at least a portion is bent, and
each of the second pressure sensors includes a second resistance sensing line of which at least a portion is bent,
wherein a first thickness of the first resistance sensing line is smaller than a second thickness of the second resistance sensing line.

21. The display device of claim 14, further comprising:
a first bumper disposed on at least one of upper and lower surfaces of each of the first pressure sensors; and
a second bumper disposed on at least one of upper and lower surfaces of each of the second pressure sensors.

22. The display device of claim 21, wherein a first overlapping area of the first pressure sensor and the first bump is larger than a second overlapping area of the second pressure sensor and the second bumper.

23. The display device of claim 21, wherein a first height of the first bumper is different from a second height of the second bumper.

24. The display device of claim 14, wherein a center of curvature of the curved shaped is located on a first surface on which the image is displayed, and a second pressure detection sensitivity of the second pressure sensor in response to a touch input that is applied in a normal direction of the second touch region is smaller than a first pressure detection sensitivity of the first pressure sensor in response to a touch input that is applied in a direction perpendicular to the first touch region.

25. A display device comprising:
a display panel displaying an image through a first display region and a third display region disposed at one side of the first display region; and
a touch sensor disposed on at least one of upper and lower surfaces of the display panel, the touch sensor including first pressure sensors disposed in a first touch region corresponding to the first display region and third pressure sensors disposed in a third touch region corresponding to the third display region,
wherein virtual buttons are displayed in the third display region,
wherein a first structure of the first pressure sensors is different from a third structure of the third pressure sensors, and
wherein the first display region and the third display regions have a flat shape.

26. The display device of claim 25, wherein a third pressure detection sensitivity of the third pressure sensors is smaller than a first pressure detection sensitivity of the first pressure sensors.

27. The display device of claim 25, wherein the display panel further includes a second display region disposed at one side of the first display region and the third display region, and
the touch sensor further includes second pressure sensors disposed in a second touch region corresponding to the second display region,
wherein the second display region and the second touch region have a curved shape.

28. The display device of claim 27, wherein a second pressure detection sensitivity of the second pressure sensors in response to a touch input that is applied in a normal direction of the second touch region is larger than a first pressure detection sensitivity of the first pressure sensors in response to a touch input that is applied in a direction perpendicular to the first touch region.

* * * * *